(12) United States Patent
Covey

(10) Patent No.: US 9,703,172 B2
(45) Date of Patent: *Jul. 11, 2017

(54) ALL-OPTICAL LOGIC GATES USING NONLINEAR ELEMENTS—CLAIM SET V

(76) Inventor: John Luther Covey, Braselton, GA (US)

(*) Notice: Subject to any disclaimer, the term of this patent is extended or adjusted under 35 U.S.C. 154(b) by 714 days.

This patent is subject to a terminal disclaimer.

(21) Appl. No.: 12/748,955

(22) Filed: Mar. 29, 2010

(65) Prior Publication Data

US 2010/0182665 A1    Jul. 22, 2010

Related U.S. Application Data

(63) Continuation of application No. 12/130,851, filed on May 30, 2008, now Pat. No. 7,689,081, which is a continuation of application No. 11/354,468, filed on Feb. 14, 2006, now Pat. No. 7,409,131.

(51) Int. Cl.
  *G02B 6/00*   (2006.01)
  *G02F 3/00*   (2006.01)
  *G02F 3/02*   (2006.01)

(52) U.S. Cl.
  CPC .......... *G02F 3/024* (2013.01); *G02F 2202/32* (2013.01); *G02F 2203/15* (2013.01)

(58) Field of Classification Search
  CPC ... G02F 3/024; G02F 2203/15; G02F 2202/32
  USPC .......................................................... 359/108
  See application file for complete search history.

(56) References Cited

U.S. PATENT DOCUMENTS

| | | | |
|---|---|---|---|
| 3,760,297 | A | 9/1973 | Thompson |
| 4,540,243 | A | 9/1985 | Fergason |
| 4,630,898 | A | 12/1986 | Jewell |
| 4,695,121 | A | 9/1987 | Mahapatra et al. |
| 4,701,030 | A | 10/1987 | Jewell |
| 4,720,175 | A | 1/1988 | Haus et al. |
| 4,854,676 | A | 8/1989 | Kalyanaraman et al. |

(Continued)

FOREIGN PATENT DOCUMENTS

| | | |
|---|---|---|
| JP | 61-112888 | 5/1986 |
| JP | 61-502844 | 12/1986 |

(Continued)

OTHER PUBLICATIONS

Office communication, Jun. 5, 2012, Japanese application 2008-555228.

(Continued)

*Primary Examiner* — John M Bedtelyon

(57) ABSTRACT

An all-optical logic gates comprises a nonlinear element such as an optical resonator configured to receive optical input signals, at least one of which is amplitude-modulated to include data. The nonlinear element is configured in relation to the carrier frequency of the optical input signals to perform a logic operation based on the resonant frequency of the nonlinear element in relation to the carrier frequency. Based on the optical input signals, the nonlinear element generates an optical output signal having a binary logic level. A combining medium can be used to combine the optical input signals for discrimination by the nonlinear element to generate the optical output signal. Various embodiments include all-optical AND, NOT, NAND, NOR, OR, XOR, and XNOR gates and memory latch.

20 Claims, 18 Drawing Sheets

ALL-OPTICAL NOR GATE RECEIVING ONE OR TWO 1-BITS
AND OUTPUTTING A 0-BIT

(56) References Cited

U.S. PATENT DOCUMENTS

| | | | |
|---|---|---|---|
| 5,001,523 | A | 3/1991 | Lomashevich et al. |
| 5,076,672 | A | 12/1991 | Tsuda et al. |
| 5,267,336 | A | 11/1993 | Sriram |
| 5,436,759 | A | 7/1995 | Dijaili et al. |
| 5,654,818 | A | 8/1997 | Yao |
| 6,035,079 | A | 3/2000 | Fields et al. |
| 6,081,470 | A | 6/2000 | Vaccaro et al. |
| 6,101,300 | A | 8/2000 | Fan et al. |
| 6,130,969 | A | 10/2000 | Villeneuve et al. |
| 6,411,752 | B1 | 6/2002 | Little et al. |
| 6,462,865 | B1 | 10/2002 | Chu et al. |
| 6,483,614 | B1 | 11/2002 | Romaniuk |
| 6,512,866 | B1 | 1/2003 | Fan et al. |
| 6,577,654 | B1 | 6/2003 | Dijaili et al. |
| 6,707,600 | B1 | 3/2004 | Dijaili et al. |
| 6,853,658 | B1 | 2/2005 | DiJaili |
| 7,126,731 | B1 | 10/2006 | DiJaili et al. |
| 2002/0118923 | A1 | 8/2002 | Wang et al. |
| 2002/0195208 | A1 | 12/2002 | Johnson |
| 2003/0179425 | A1 | 9/2003 | Romaniuk |
| 2004/0017604 | A1 | 1/2004 | DiJaili et al. |
| 2004/0033009 | A1 | 2/2004 | Soljacic et al. |
| 2004/0046167 | A1 | 3/2004 | McCoy |
| 2004/0081464 | A1 | 4/2004 | Watanabe |
| 2004/0105615 | A1 | 6/2004 | Okuno |
| 2005/0163419 | A1* | 7/2005 | Scherer ..................... 385/16 |
| 2005/0259999 | A1 | 11/2005 | Covey |

FOREIGN PATENT DOCUMENTS

| | | |
|---|---|---|
| JP | 62-269125 | 11/1987 |
| JP | 0373541 | 6/1990 |
| JP | H3-2845 | 1/1991 |
| JP | 03-002845 | 9/1991 |
| JP | 09-005812 | 1/1997 |
| JP | 09-005812 | 10/1997 |
| JP | 2004110020 | 4/2004 |
| JP | 2004-314011 | 12/2004 |
| JP | 2005-250398 | 9/2005 |
| WO | WO02065205 | 8/2002 |
| WO | WO 03091775 | 11/2003 |
| WO | WO2004061524 | 7/2004 |
| WO | WO2004099864 | 11/2004 |

OTHER PUBLICATIONS

Office communication, Jul. 15, 2009, Canadian application 2655058.
Office communication, Dec. 4, 2009, Chinese application 200680054226.3.
Office communication, Dec. 31, 2009, U.S. Appl. No. 12/388,813.
Office communication, Mar. 9, 2010, Japanese application 2009-035638.
Notemi, Optical bistable switching action of Si high-Q photonic crystal nanocavities, 2005.
Shinya, All-optical flip-flop circuit composed of coupled two port resonant tunneling filter in two dimensional photonic crystal slab, 2006.
Ibrahim, All-optical AND/NAND logic gates using semiconductor microresonators, 2003.
Wang, Externally low switching thresholds in nonlinear DFB fiber grating structures combined with Fabry-Perot cavity, 1997.
Office communication, Mar. 9, 2010, Japanese application 2009-035701.
Jewell, Use of single nonlinear Fabry-Perot etalon as optical logic gates, 1984.
Office communication, Apr. 27, 2010, Japanese application 2009-035765.
Office communication, Apr. 27, 2010, Japanese application 2009-035227.
Office communication, Sep. 7, 2010, Japanese application 2009-035638.
Office communication, Sep. 7, 2010, Japanese application 2009-035701.
Office communication, search report, Dec. 9, 2010, European application 10183803.5-2205.
Office communication, search report, Dec. 15, 2010, European application 10183790-2205.
Office communication, Jan. 18, 2011, European application 04 822 328.3-2205.
Office communication, Feb. 3, 2011, Canadian application 2655058.
Asakowa, Fabrication and characterization of photonic crystal slab waveguides and application to ultra fast all optical switching devices, 2003.
Office communication, Mar. 10, 2011, European application 11 152 701.6-2217.
Office communication, search report, Mar. 15, 2011, European application 10 18 3803.
Sondergaard, Designing finite-height two-dimensional photonic crystal waveguides, 2000.
Poborchii, Si pillar photonic crystal slab with linear defects: transmittance and waveguide properties, 2002.
Office communication, May 4, 2011, European application 06 844 875.2-2217.
Office communication, May 6, 2011, European application 06 844 875.2-2217.
Office communication, Apr. 27, 2011, European application 10183790.4-2205/2284606.
Office communication, May 2, 2011, European application 10183803.5-2205/22758603.
Office communication, Sep. 30, 2011, Chinese application 200910007693.6.
Shinya, All optical switching of cavity waveguide coupling system in two dimensional photonic crystal slab, date unknown, but presumed in or after 2003 (cites 2003 source).
Office communication, Sep. 22, 2011, Japanese application 2009-35227.
Office communication, Sep. 14, 2011, Japanese application 2009-35765.
Office communication, Sep. 15, 2011, Japanese application 2009-35157.
Office communication, Oct. 5, 2011, Canadian application 2641953.
Office communication, search report, May 2, 2011, European application 10183803.5-2205/2275863.
Office communication, search report, Apr. 27, 2011, European application 10183790.4-2205/2284606.
Office communication, Dec. 6, 2011, Japanese application 2009-35227.
Office communication, Dec. 6, 2011, Japanese application 2009-35765.
Office communication, Dec. 6, 2011, Japanese application 2009-35157.
Office communication, search report, Jun. 10, 2011, European application 11152701.6-2217/2312387.
Office communication, search report, May 31, 2011, European application 11152702.4.
Office communication summary (citing references), Mar. 8, 2012, Korean application 10-2008-7025571.
Office communication, Mar. 21, 2012, Chinese application 200910007693.6.
Office communication, Mar. 12, 2012, Chinese application 201110031423.6.
Office communication, Sep. 21, 2010, Japanese application 2009-035157.
Office communication, Mar. 16, 2010, U.S. Appl. No. 11/354,475.
Office communication, Jan. 20, 2011, U.S. Appl. No. 11/354,475.
Office communication, Nov. 17, 2014, U.S. Appl. No. 11/354,475.
Office communication, Aug. 13, 2015, U.S. Appl. No. 11/354,475.
Office communication summary, Jul. 20, 2012, Korean application 10-2012-7014947.
Office communication, Jan. 11, 2013, Chinese application 201110031423.6.
Office communication, Feb. 4, 2013, Chinese application 200910007693.6.

(56) References Cited

OTHER PUBLICATIONS

Office communication, Jul. 15, 2013, Chinese application 201110031424.0.
Office communication, Jun. 26, 2013, Canadian application 2655058.
Office communication, Jan. 28, 2014, Canadian application 2641953.
Office communication, Feb. 14, 2014, Chinese application 201110031424.0.
Office communication, Feb. 25, 2014, Indian application 3745/KOLPN/2008.
Office communication, Feb. 12, 2014, European application 10183790.4-1904.
Office communication, Jul. 10, 2014, Canadian application 2655058.
Office communication, Sep. 2, 2014, Japanese application 2013-189392.
Van et al., Optical signal processing using nonlinear semiconductor microring resonators, IEEE 2002.
Ibrahim et al., All-optical AND/NAND logic gates using semiconductor microresonators, IEEE 2003.
Mikroulis et al.., Ultrafast all-optical AND logic operation based on four-wave mixing in a passive InGaAsP—InP microring resonator, IEEE 2005.
Office communication, Jun. 26, 2015, European application 10183803.5-1904.
Office communication, Jul. 23, 2015, European application 10183790.4-1904.
Office communication, Oct. 8, 2015, Chinese application 201110031424.0.
Office communication, Jan. 21, 2016, European application 10183790.4-1904/2284606.
Office communication, search report, Feb. 19, 2014, European application 13197457.8-1562.
Office communication, May 17, 2016, European application 13197457.8-1562.
Office communication, Apr. 28, 2016, European application 10183803.5-1904.
Kiyoshi Asakawa, *Fabrication and Characterization of Photonic Crystal Slab Waveguides and Application to Ultra-Fast All-Optical Switching Devices*, ICTON 2003.
Search report for European published application No. 16155919.0, Mar. 8, 2016.
Office communication, 2016, European application 16155919.0.
Office communication, Nov. 25, 2016, European application 13197457.8-1562, 9 pgs.
Office communication, Nov. 3, 2016, European application 10183803.5-1904, 5 pgs.

\* cited by examiner

NONLINEAR ELEMENT TRANSMISSION DETUNED AWAY
FROM TRANSMITTING INPUT CARRIER FREQUENCY

DETUNED NONLINEAR ELEMENT TRANSMISSION SHIFTING
ONTO TRANSMITTING INPUT CARRIER FREQUENCY

ALL-OPTICAL N AND GATE RECEIVING 1 BITS AS OPTICAL INPUT SIGNALS
AND OUTPUTTING A 0-BIT AS OPTICAL OUTPUT SIGNAL

ALL-OPTICAL NOR GATE RECEIVING ONE OR TWO 1-BITS
AND OUTPUTTING A 0-BIT

ALL-OPTICAL XOR GATE

ALL-OPTICAL LOGICAL GATE USING CIRCULATOR WITHOUT SEPARATE COMBINING MEDIUM

ALL-OPTICAL LOGICAL GATE IMPLEMENTED WITH
MIRRORS AND NONLINEAR ELEMENT

GENERALIZED ALL-OPTICAL LOGICAL GATE

METHOD OF MANUFACTURING OPTICAL LOGIC CIRCUIT

METHOD OF OPERATION OF LOGIC GATE

ALL-OPTICAL LOGIC GATES USING NONLINEAR ELEMENTS—CLAIM SET V

CROSS REFERENCE TO RELATED APPLICATIONS

This Application is a continuation of U.S. application Ser. No. 12/130,851, filed on May 30, 2008 now U.S. Pat. No. 7,689,081, which is a continuation of U.S. application Ser. No. 11/354,468, filed on Feb. 14, 2006, now U.S. Pat. No. 7,409,131. The foregoing applications are hereby incorporated by reference in their entirety.

BACKGROUND OF THE INVENTION

1. Field of the Invention

This invention relates to optical devices functioning as all-optical logic gates. More specifically, digital optical signals are combined and provided to nonlinear elements such as optical resonators or cavity switches whose resonance frequencies are tuned to produce desired logic output signals.

2. Description of the Related Art

In electronic devices, logic gates composed of transistors comprise the basic elements of digital circuits. Voltage-based inputs are received by the gates, resulting in voltage-based output signals corresponding to the desired logical function.

Interest has begun to emerge in recent years toward development of an optical device that behaves analogously to electronic logic gates. The reason for this interest is that optical signals can potentially travel faster in integrated circuits than electrical signals because they are not subject to capacitance which slows switching speed between logic states. Given the ever increasing demand for faster switching, it is expected that in the future, absent a major technological advance in electronics, use of digital optical devices will become increasingly desirable if not essential.

However, use of optical devices to form integrated logic circuits presents unique challenges. By its nature light propagates and cannot be stored. The ability to represent a logic level stably for as long as may be required becomes an issue. It would thus be desirable to provide optical logic gates that can be used to represent logic states stably using optical signals.

Moreover, there is an established industry using optical components which use primarily amplitude-modulated optical signals in which the amplitude or intensity of light pulses represents digital logic states. Any solution able to store and process data optically should also ideally be compatible with existing optical telecommunications infrastructure.

In some optical modulation schemes, data is represented by more than two amplitude levels. The problem with such an approach is that it requires very stringent control on the amplitudes of the optical signals on which logic operations are performed. For example, in an AND gate, if two pulses are both at high or "1" logic levels represented by an amplitude of "1" in this example, then the output will have an amplitude that is the linear sum of these two levels, or "2". A "2" is then passed on to the logic gate of the next stage, which must be configured to account for a "2" representing a high logic level and a "1" or "0" representing a low logic level. Thus, the problem of two or more high levels adding becomes more complicated and compounds as logic gates are cascaded. It would therefore be desirable to provide an optical circuit that avoids this problem.

As signals propagate through optical devices, propagation losses become a significant problem that usually inhibits the cascading of optics. Moreover, providing gain to optical signals in a densely integrated substrate currently has technological and practical barriers to being achieved. If restoration of digital optical signals could be managed in another fashion, cascading several optical logic gates would be possible.

Nonlinear optical cavities are typically used to perform all-optical switching. The term 'nonlinear' specifically refers to a resonator comprised of a material(s) whose index of refraction depends upon the intensity or power inside the resonator. The incident power depends upon the combination of the input signals, which in turn determines the index of refraction inside the resonator. The resonator's resonance frequency depends upon its index of refraction as follows:

$$f = \frac{qc}{2nL},$$

in which f is the resonator's resonant frequency, c is the speed of light, L is the resonator's length, q is any positive integer, and n is the index of refraction. The resonator's unloaded index and length can be adjusted to a slightly different resonant frequency than the input carrier frequency so that only light of sufficient power can increase or decrease the resonator's index of refraction enough to shift the resonator's resonant frequency to equal the incoming carrier frequency. Once the input light resonates within the resonator, the photons have much higher resonator lifetimes and a larger percentage of the input is transmitted through the resonator as an output. The ability of the resonator to readily switch from an opaque state to a transparent state based on a designed amount of input power is why nonlinear cavities are the most common form of all-optical switches.

Although sufficient power can switch a nonlinear resonator to transmit, even greater amounts of input power will further shift the resonator's resonant frequency until it no longer matches the carrier frequency, switching the output off. This behavior has always been considered undesirable, for conventional digital design requires a constant output level regardless of the input level once a threshold is reached. The current thinking and state of the art in research and industry fails to recognize that this behavior could instead be used to a designer's advantage in a way that implementing all-optical logic would be considered much more favorably than it is today.

A nonlinear resonator can also function as the inverse of the detuned resonator described above by having its unloaded resonance frequency equal the input carrier frequency. Inputs with relatively low power will then be transmitted, while inputs of relatively high power will shift the resonator out of resonance and switch the output off. It has not been heretofore recognized that this inverting functionality of a nonlinear resonator is useful if properly utilized in conjunction with other features described above.

SUMMARY OF THE INVENTION

The disclosed devices, in their various embodiments, each overcome one or more of the above-mentioned problems, and achieve additional advantages as hereinafter set forth.

A logic gate in accordance with the invention receives one or more digital, amplitude-modulated optical input signals. In some embodiments, one of the optical input signals is continuous wave (CW) light from a laser source, for example. The logic gate comprises a nonlinear element which receives the optical input signals, or a combined signal resulting from their combination, and nonlinearly discriminates logic level to generate an optical output signal having a binary logic level. The nonlinear element can comprise an optical resonator or cavity configured so that it is tuned relative to the carrier frequency of the optical input signals to perform a particular logic operation. In some embodiments, the logic gate comprises a combining medium to receive and combine the optical input signals to produce the combined signal, which the combining medium outputs to the nonlinear element for logic level discrimination. In other embodiments, the optical input signals are provided to the nonlinear element, which effectively combines and discriminates their logic levels. In some of the embodiments, one or more waveguides are used to guide the optical input signals to the combining medium or nonlinear element. In some embodiments, one or more waveguides can be used to receive the optical output signal from the nonlinear element and provide the same to a downstream element as the output of the logic gate. Logic gates can be optically coupled together in series to form an optical circuit capable of performing virtually any logic function. Individual or combined logic gates are capable of performing AND, NOT, NAND, NOR, OR, XOR, and XNOR logic operation.

The nonlinear element acts as a switch responsive to the logic levels of the optical input signals and either switches its output from off to on or from on to off depending on how the nonlinear element is tuned or detuned to the input carrier frequency. Moreover, the amount of input power required to switch can be altered by changing the amount of detuning. By properly arranging the number of inputs and customizing each nonlinear element's unloaded and loaded resonant frequencies, a selected logical function can be implemented without using any electronics at competitive switching speeds. Furthermore, if continuous light is also coupled as one of the optical input signals to a nonlinear element, restoration of optical intensity (i.e. logic level) at each stage of an optical circuit is possible. If the continuous light is used to maintain the nonlinear element at maximum transmission, additional data pulses will shift the nonlinear element out of resonance, which yields all-optical logical inversion. Because all-optical intensity-restorative logic gates are possible, stable all-optical memory is another possible embodiment of this invention.

BRIEF DESCRIPTION OF THE DRAWINGS

Figure 1:
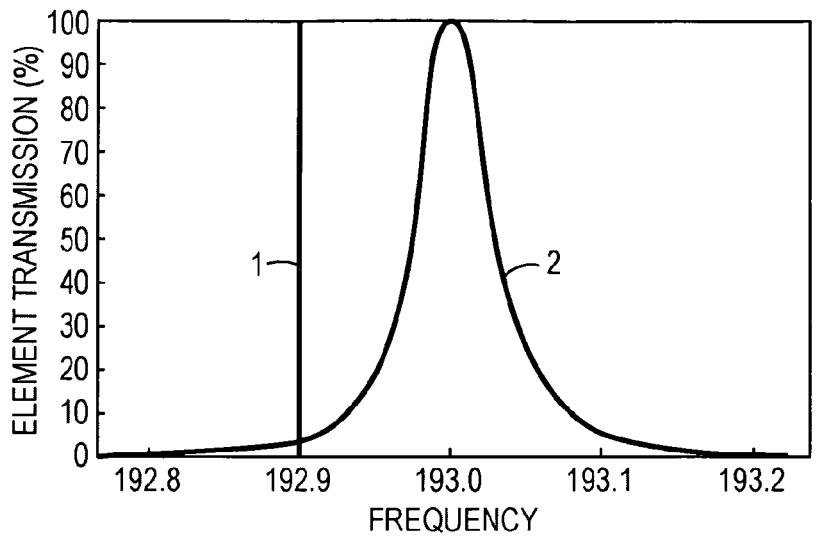

Having thus described the invention in general terms, reference will now be made to the accompanying drawings, which are not necessarily drawn to scale, and wherein:

FIG. 1 is a graph of nonlinear element (e.g., an optical resonator) transmission percentage versus frequency of light input to the nonlinear element in a case in which the intensity of the light input to the nonlinear element is insufficient to drive the nonlinear element into resonance at its resonant frequency which is detuned relative to the frequency of the input light.

Figure 2:
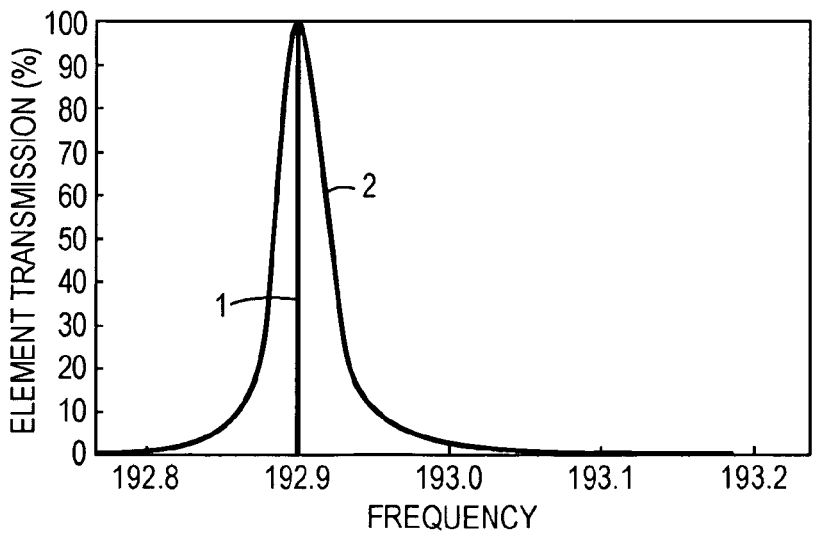

FIG. 2 is a graph of nonlinear element transmission percentage versus frequency of light input to the nonlinear element illustrating the nonlinear element's shift in resonance and in light transmission when the input light is sufficiently intense.

Figure 3:
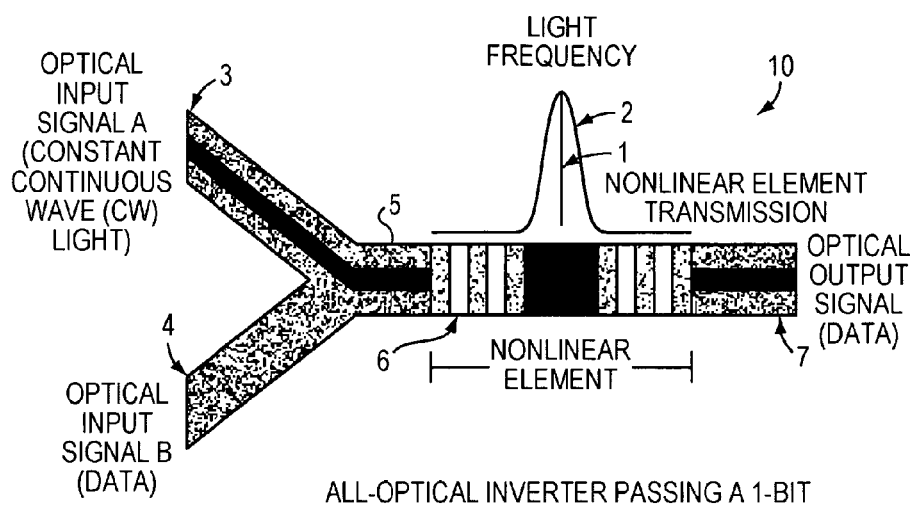

FIG. 3 is a plan view of an all-optical inverter (NOT gate), which incorporates a continuous wave (CW) light as one optical input signal, a data input that is zero a second optical input signal, and a nonlinear element (e.g., optical resonator) that is in resonant or transmission mode. Above the nonlinear element is a graph of element transmission versus frequency, with the vertical line representing the light's carrier frequency.

Figure 4:
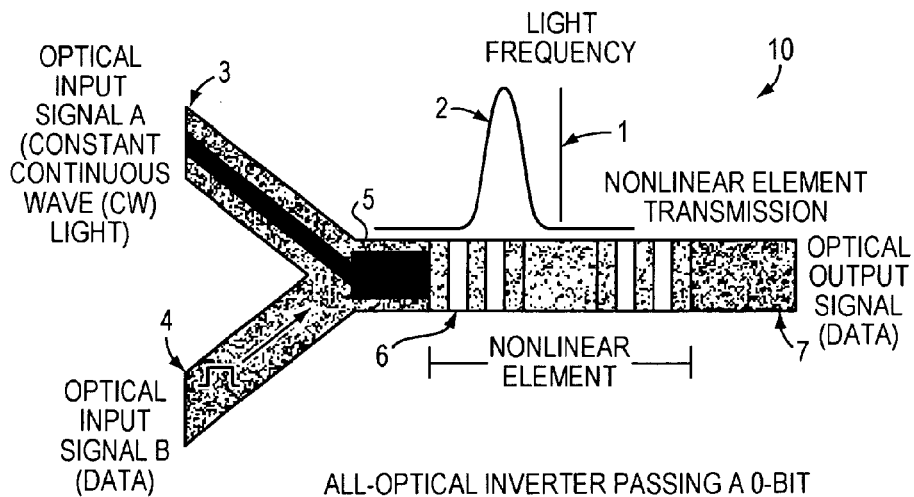

FIG. 4 is a plan view of an all-optical inverter (NOT gate), which incorporates a continuous wave (CW) light as one optical input signal, a data input as a second optical input signal that is on (i.e., high amplitude or logic level), and a nonlinear element in non-resonant or opaque mode. Above the nonlinear element is a graph of element transmission versus frequency, with the vertical line representing the light's carrier frequency.

Figure 5:
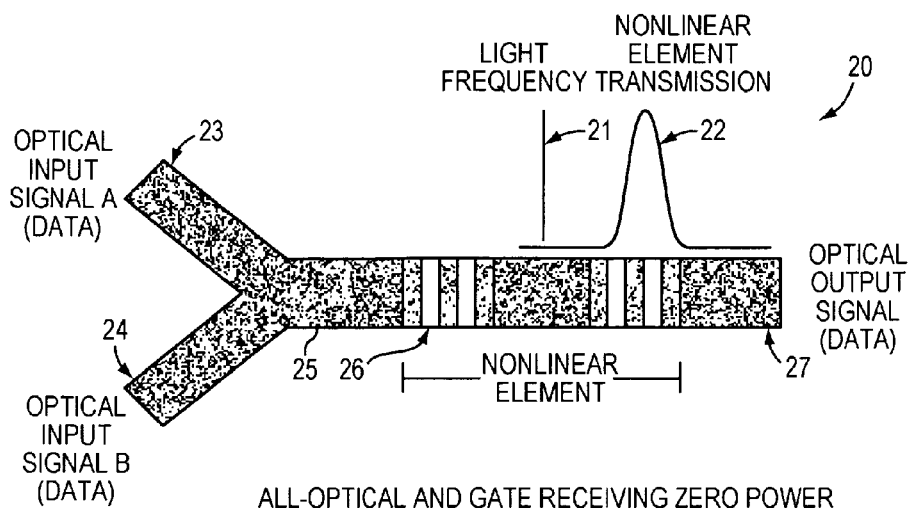

FIG. 5 is a plan view of an all-optical AND gate, which contains two optical input signals with data that are at zero amplitude (i.e., low amplitude or logic level) and a nonlinear element that is in non-resonant or opaque mode. Above the nonlinear element is a graph of element transmission versus frequency, with the vertical line representing the light's carrier frequency.

Figure 6:
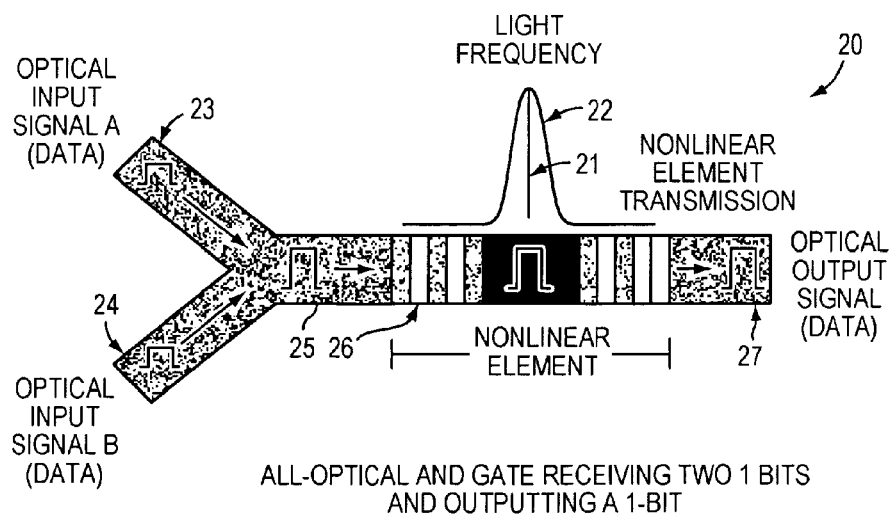

FIG. 6 is a plan view of an all-optical AND gate, which receives two optical input signals that are on (i.e., have data with a high amplitude or logic level) and a nonlinear element that is in resonant or transmission mode. Above the nonlinear element is a graph of element transmission versus frequency, with the vertical line representing the light's carrier frequency.

Figure 7:
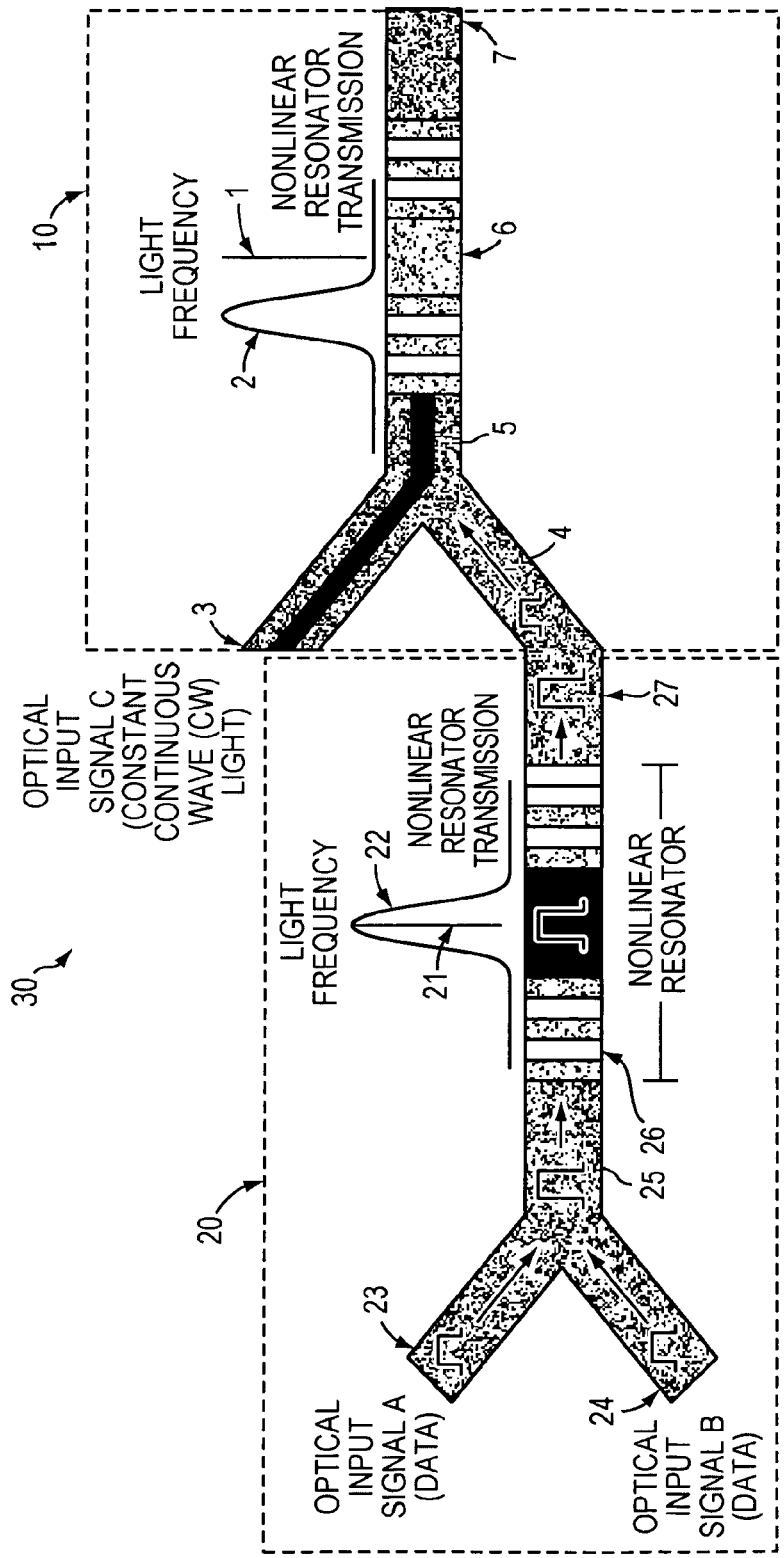

FIG. 7 is a plan view of an all-optical NAND gate receiving optical input signals having data that are both one-bits (i.e., high amplitude or logic level) and outputting an optical output signal with data having a zero-bit (i.e., low amplitude or logic level).

Figure 8:
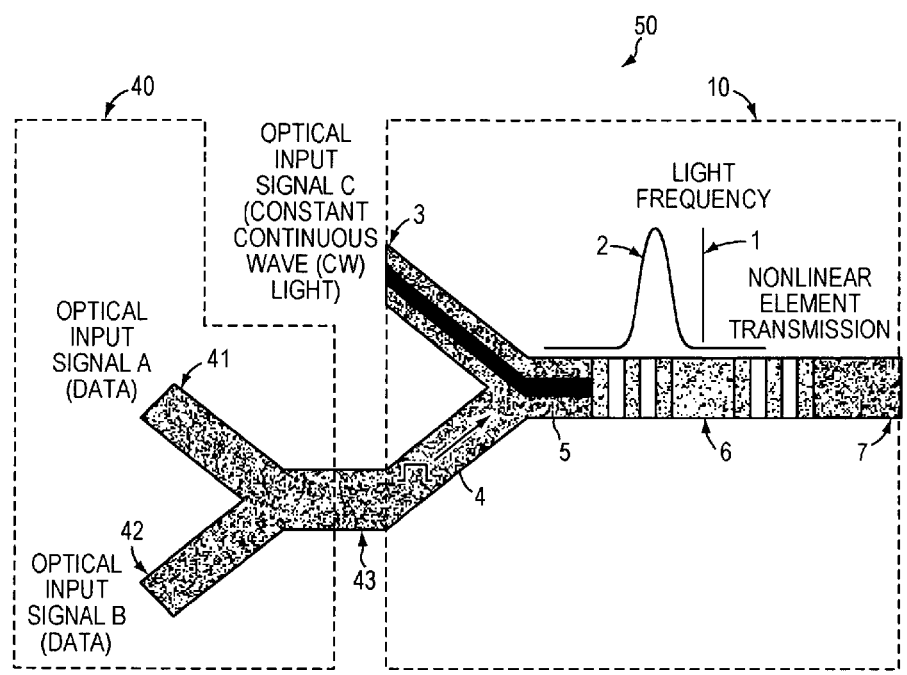

FIG. 8 is a plan view of an all-optical NOR gate, which receives continuous wave (CW) light as one optical input signal, two additional optical input signals having respective data, of which either or both are on (i.e., high amplitude or logic level), and a nonlinear element in non-resonant or opaque mode. Above the nonlinear element is a graph of element transmission versus frequency, with the vertical line representing the light's carrier frequency.

Figure 9:
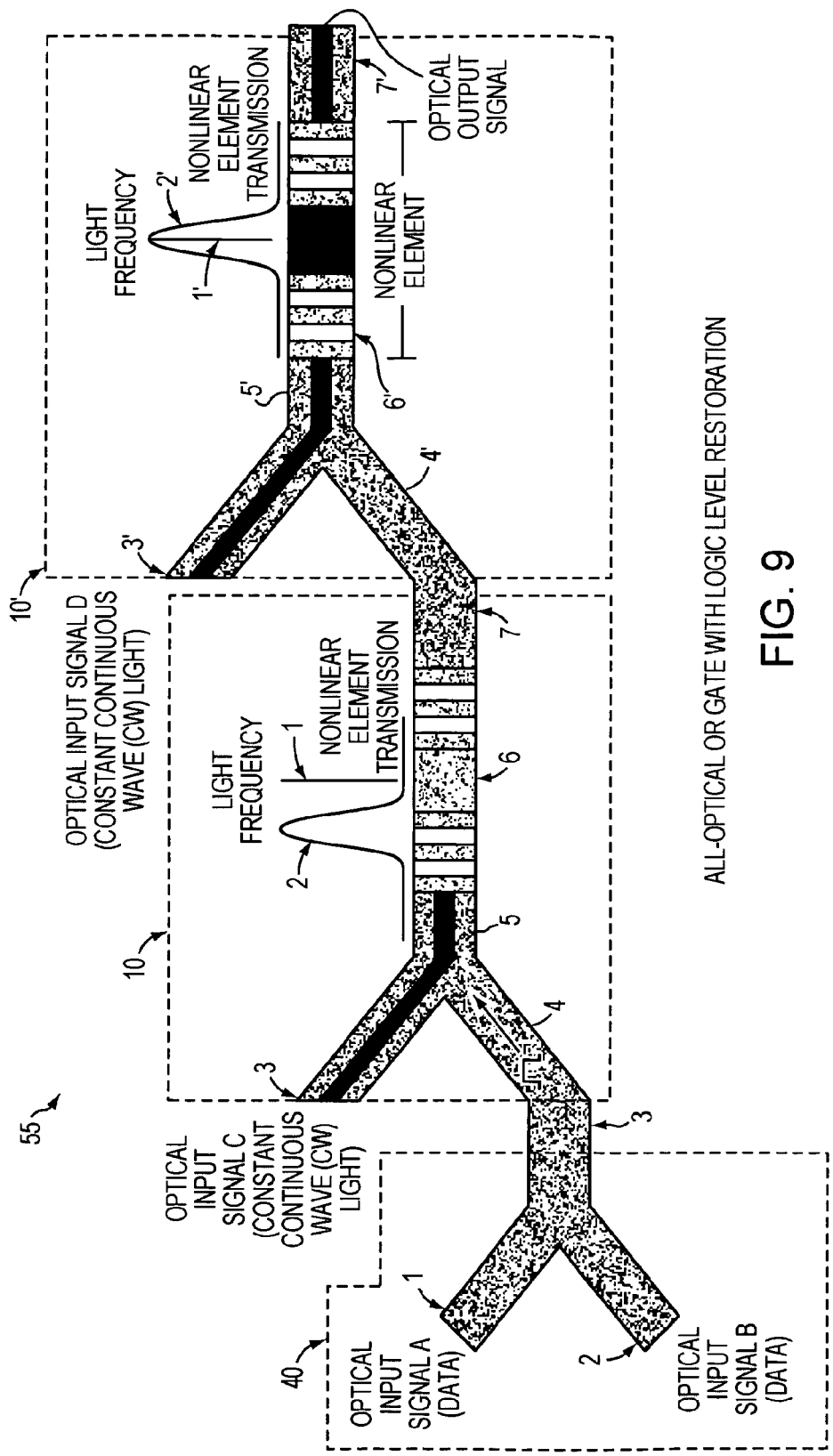

FIG. 9 is a plan view of an all-optical OR gate with logic level restoration, which receives two optical input signals having data, and which has two inverters in series which generate an optical output signal with restored logic level.

Figure 10:
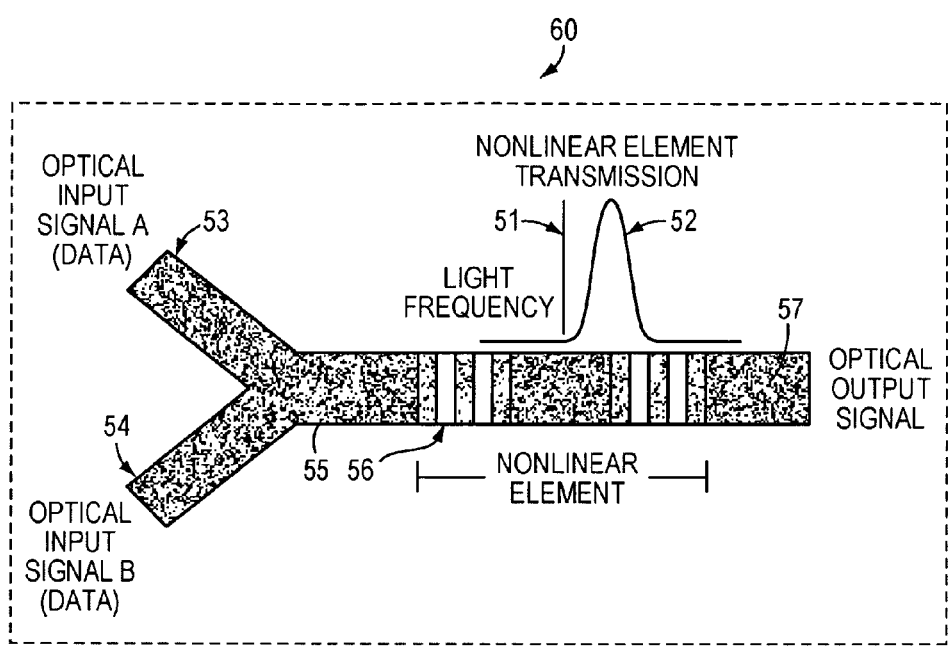

FIG. 10 is a plan view of an all-optical XOR gate, which receives two optical input signals have respective data, and comprises a nonlinear element that is detuned half as much as in FIG. 5. Above the nonlinear element is a graph of element transmission versus frequency, with the vertical line representing the light's carrier frequency.

Figure 11:
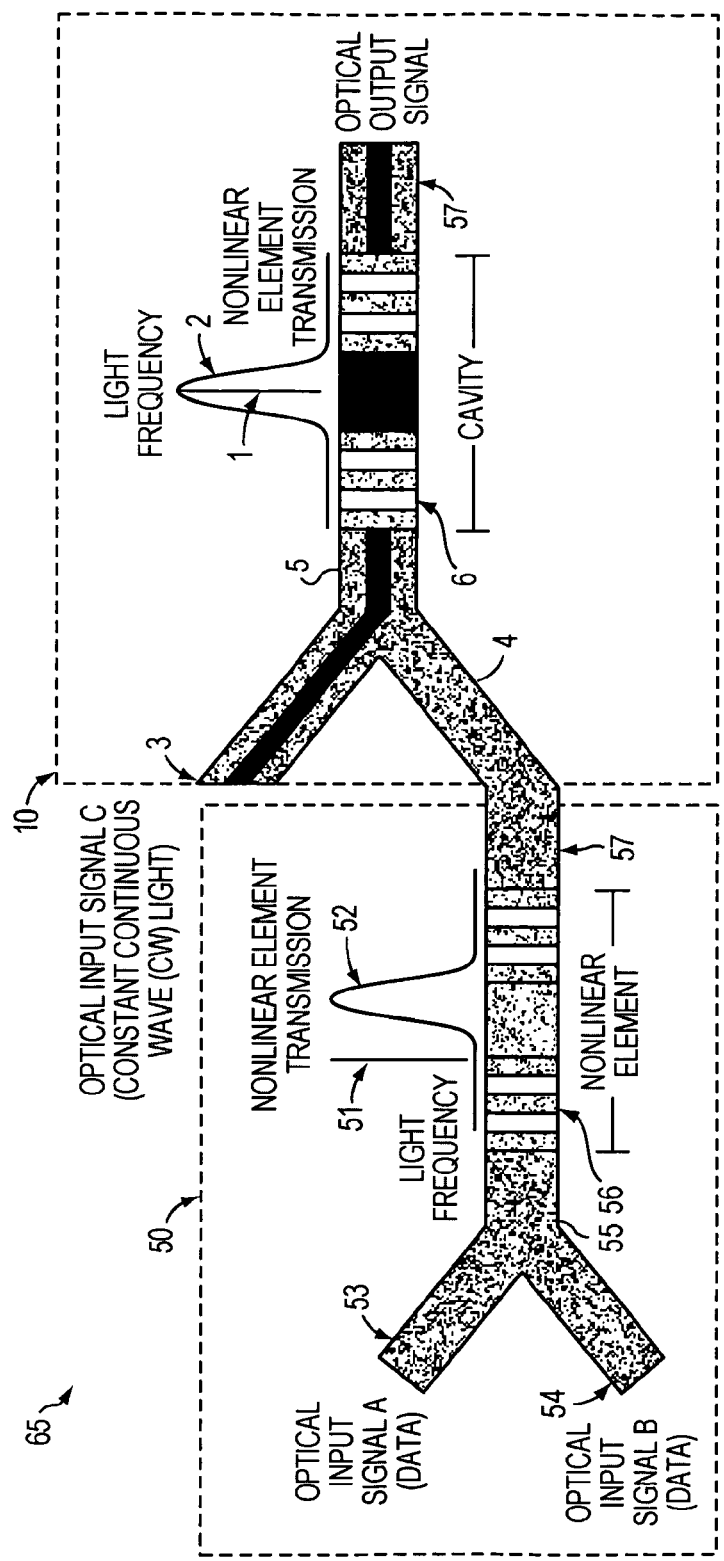

FIG. 11 is a plan view of an all-optical XNOR gate, which receives two optical input signals have respective data, and comprises a nonlinear element that is detuned half as much as in FIG. 5, followed by an inverter as shown in FIGS. 3 and 4. Above the nonlinear elements are graphs of elements transmission versus frequency, with the vertical lines representing the light's carrier frequency.

Figure 12:
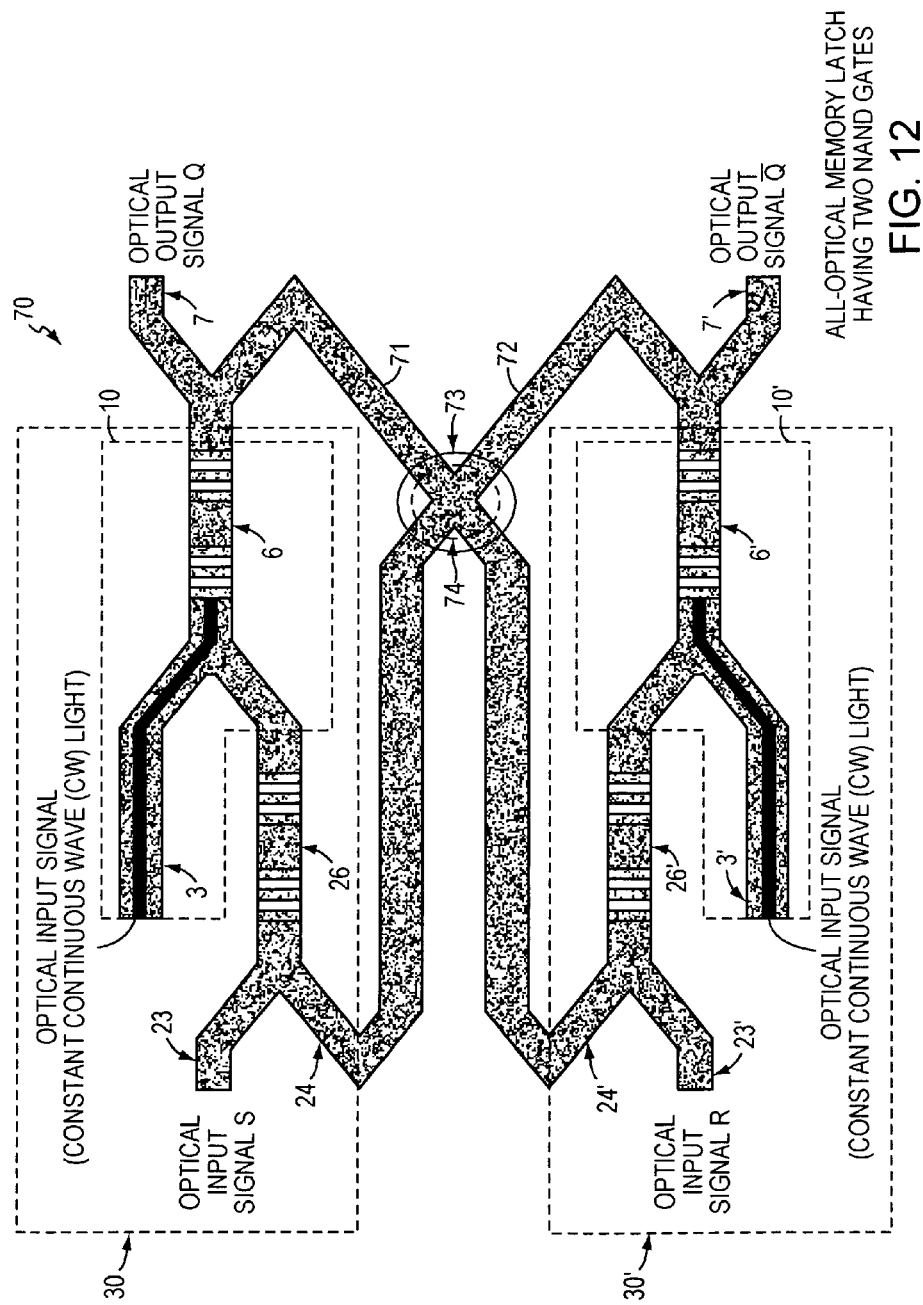

FIG. 12 is a plan view of an all-optical NAND latch having two continuous wave (CW) light inputs as optical input signals, two additional optical input signals having respective data inputs 'set' and 'reset', four nonlinear elements, and two optical output signals, Q and Q-bar.

Figure 13:
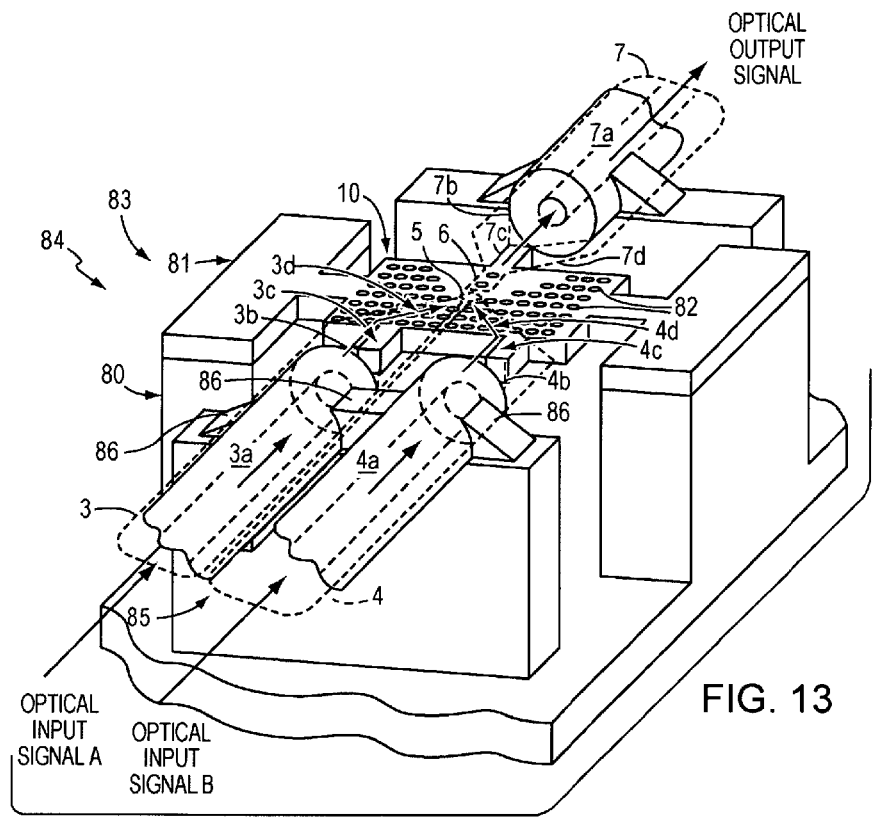

FIG. 13 is a perspective view of an optical logic gate including a photonic crystal supported by a bridge structure.

Figure 14:
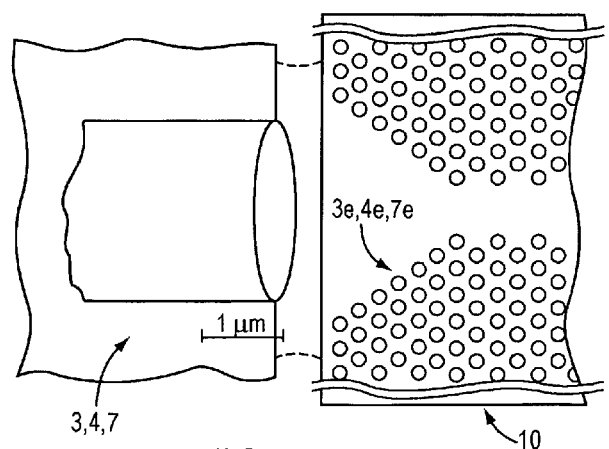

FIG. 14 is a detailed view of a portion of the photonic logic gate of FIG. 13 showing the structure of the input to the photonic logic gate that is tapered to match the modal profile of the light traveling into the logic gate from the optical fiber core.

Figure 15:
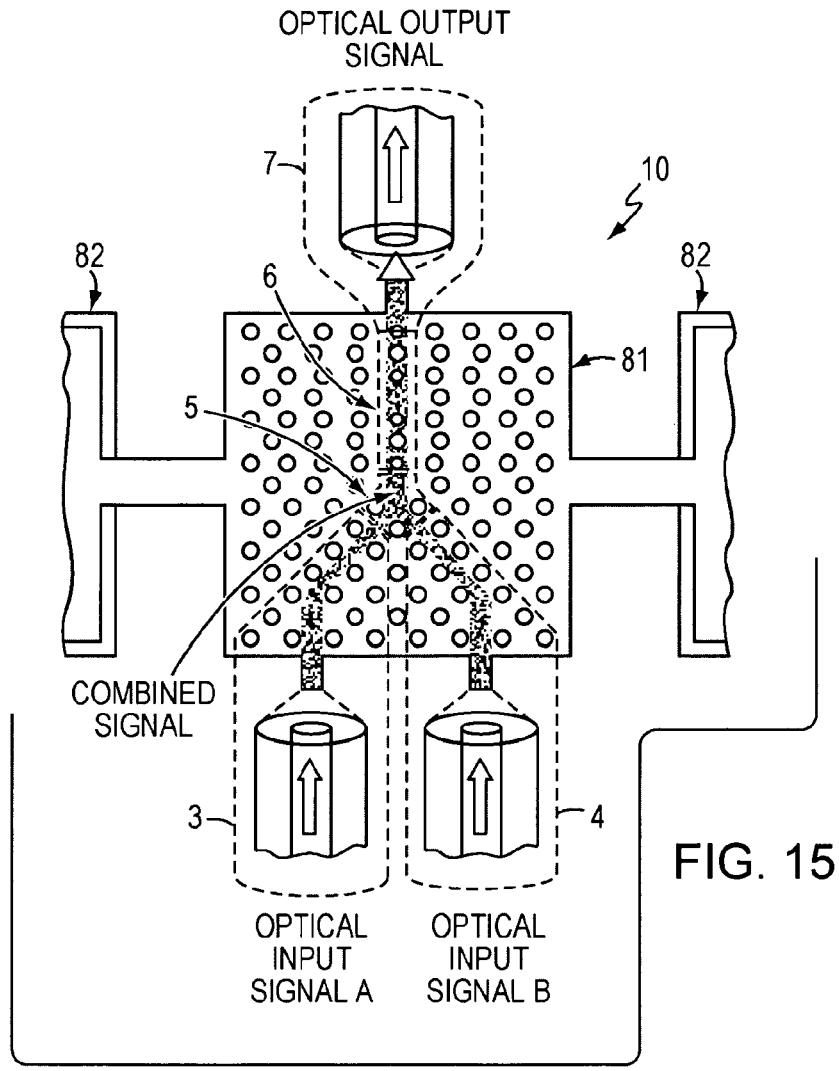

FIG. 15 is a plan view of the photonic logic gate of FIG. 13.

Figure 16:
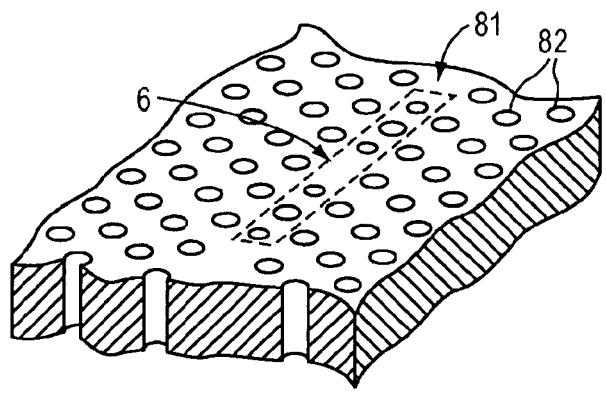

FIG. 16 is a cutaway perspective view of the photonic logic gate of FIG. 13.

Figure 17:
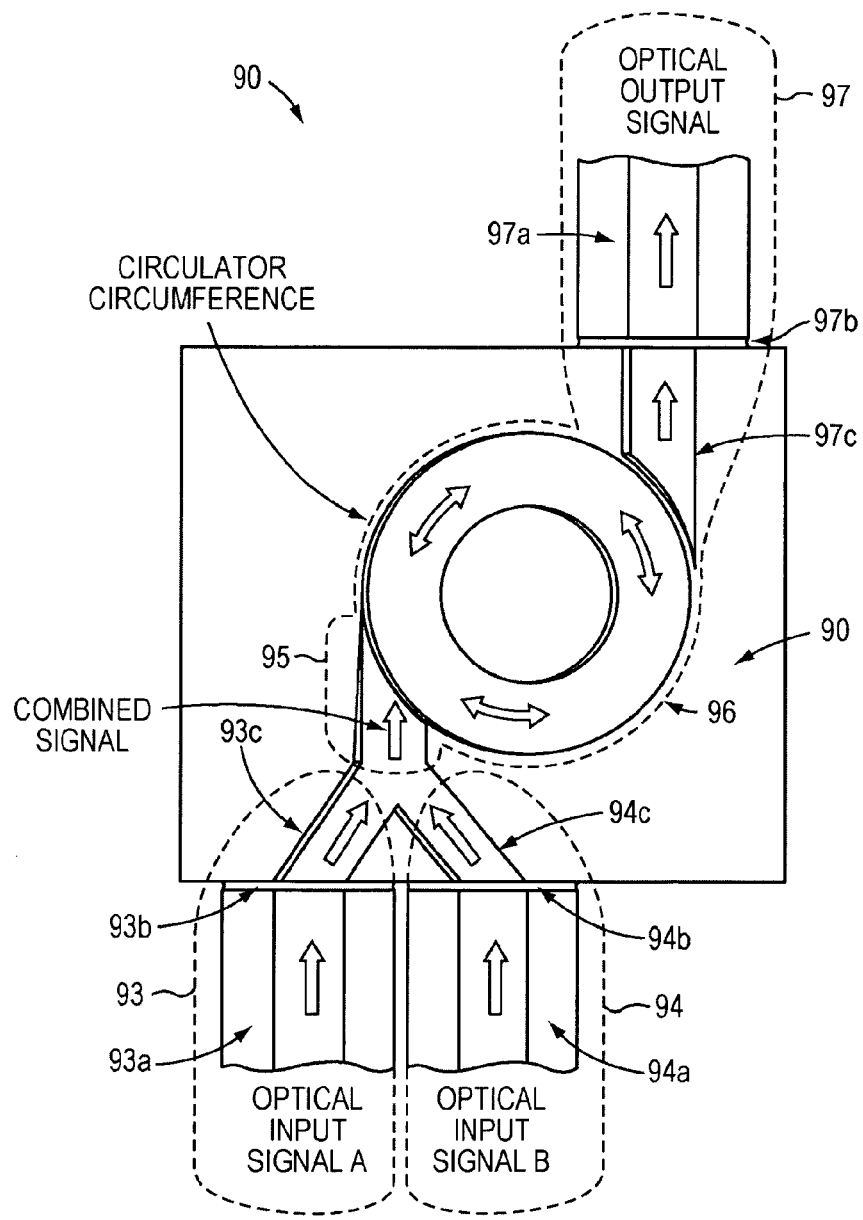

FIG. 17 is a plan view of an embodiment of an all-optical logic gate comprising a combining medium for combining optical input signals, and a nonlinear element implemented as a ring.

Figure 18:
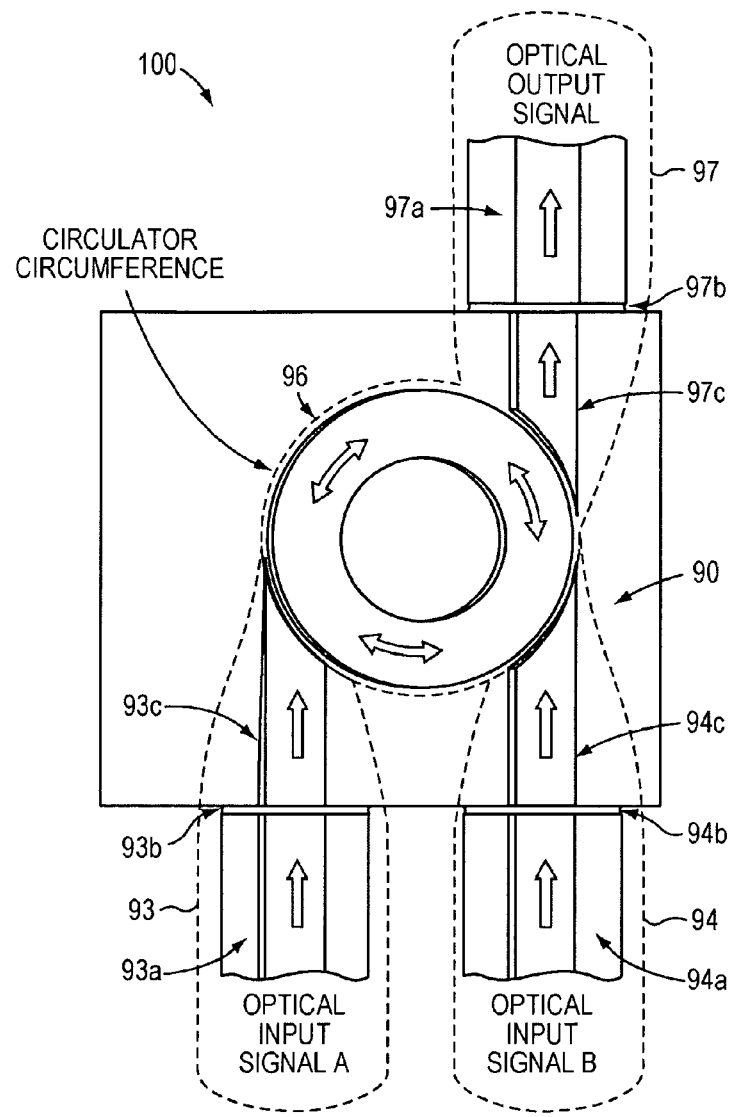

FIG. 18 is a plan view of an all-optical logic gate using ring without separate combining medium.

Figure 19:
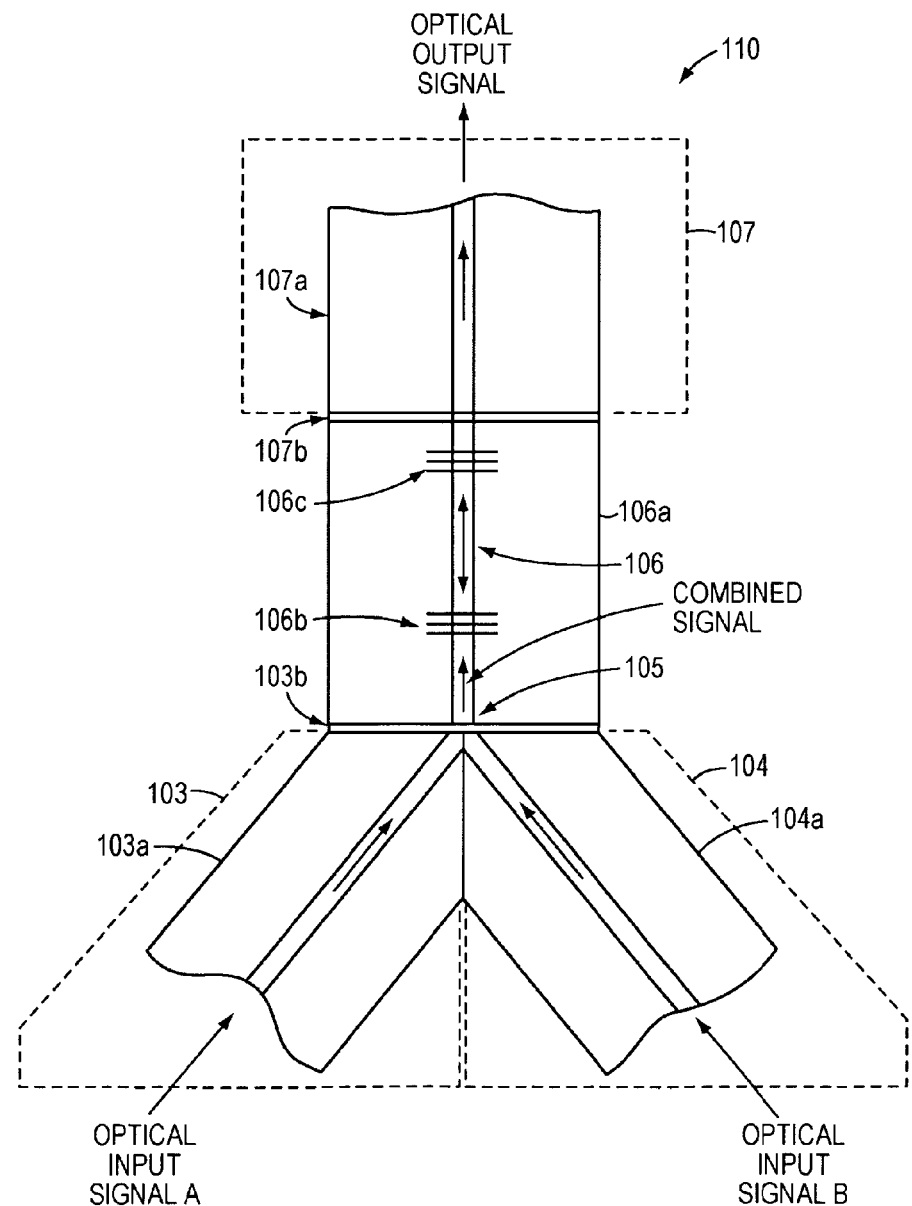

FIG. 19 is a plan view of an all-optical logic gate implemented using optical fibers.

Figure 20:
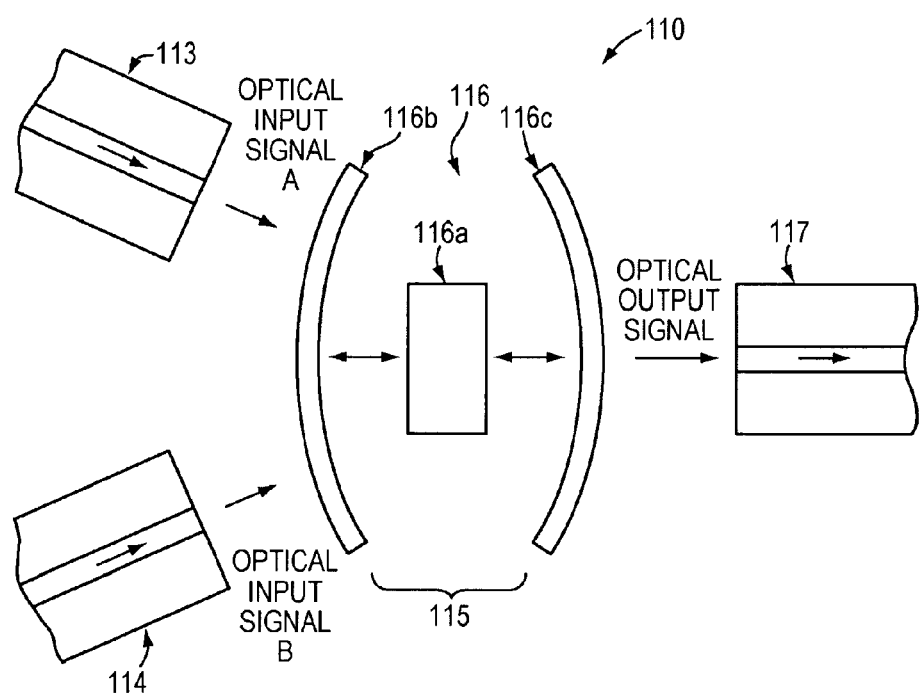

FIG. 20 is a plan view of an all-optical logic gate implemented with mirrors defining a resonator cavity with nonlinear material positioned in the cavity.

Figure 21:
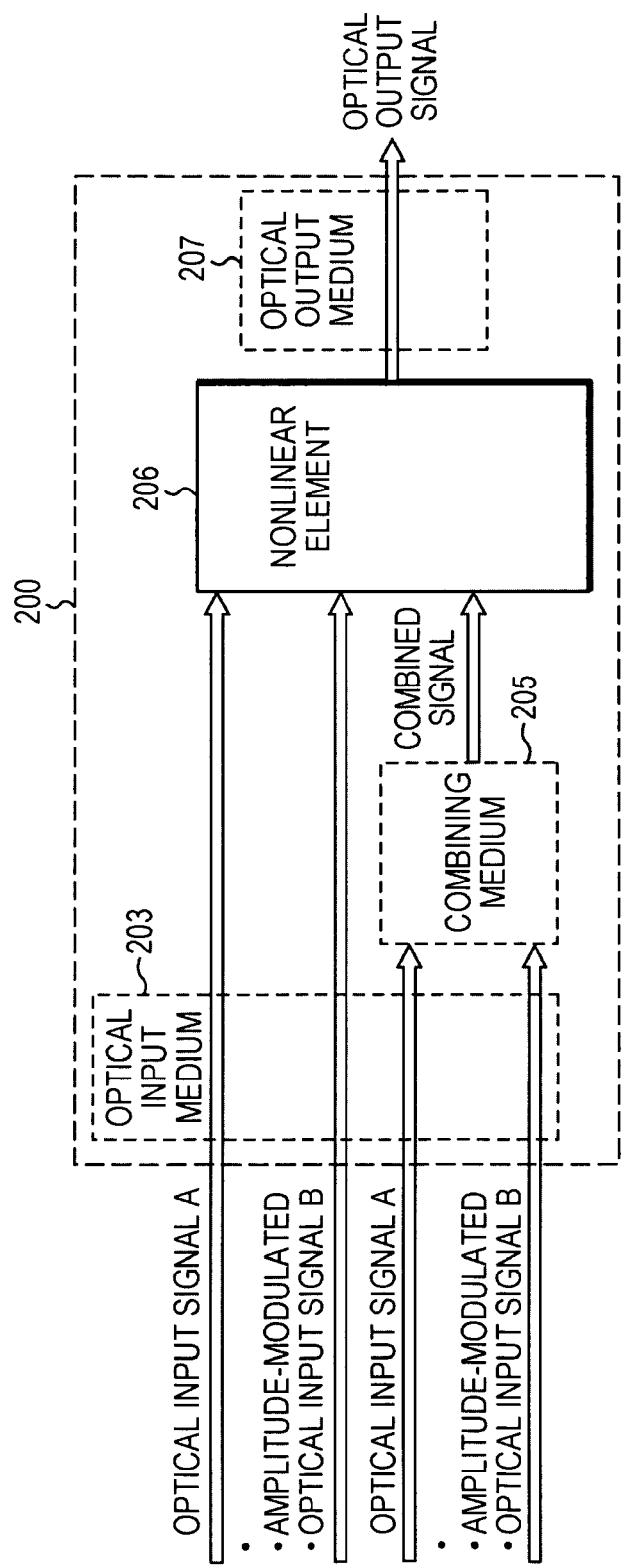

FIG. 21 is a block diagram of a generalized all-optical logic gate in accordance with the invention.

Figure 22:
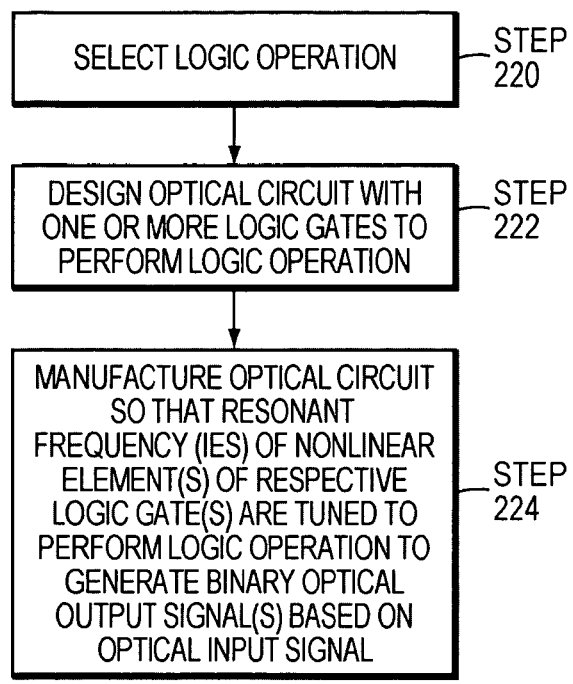

FIG. 22 is a flowchart of a generalized method of manufacturing an optical circuit including an optical logic gate(s) configured to receive an optical input signal(s) having a binary logic level, and having a nonlinear element(s) to generate an optical output signal(s) having a binary logic level.

Figure 23:
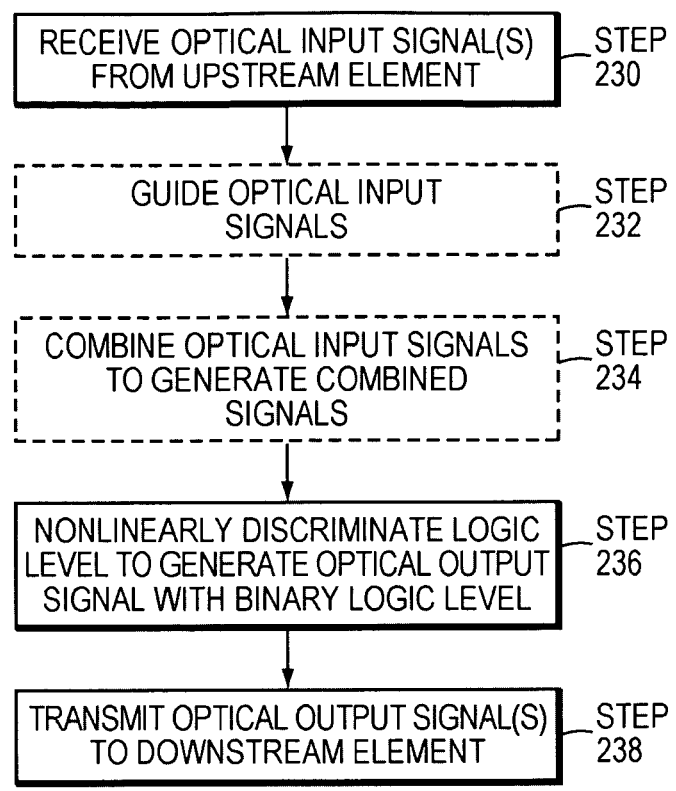

FIG. 23 is a flowchart of a method of operation of a logic gate using amplitude-based nonlinear discrimination based on optical input signal(s) with binary logic level(s) to generate an optical output signal(s) having a binary logic level(s).

DESCRIPTION OF THE PREFERRED EMBODIMENTS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

DEFINITIONS

'Downstream' refers to a position or element that is further along an optical transmission path relative to a reference point. It can also be used to refer to the direction of travel of light in an optical circuit away from a reference point.

'Off' or 'low' or '0' refers to an optical signal having a relatively low amplitude or logic level.

'On' or 'high' or '1' refers to an optical signal having a high amplitude or logic level.

'Or' is used in its inclusive sense to mean any one, some or all of the things preceding or following the word unless otherwise indicated by context. Thus, 'A or B' includes within its meaning 'A' alone, 'B' alone, and both 'A' and 'B' together.

'(s)' or '(ies)' means one or more of the thing meant by the word immediately preceding the phrase '(s)'. Thus, 'signal(s)' means 'one or more signals.'

'Tuning' generally refers to configuring a nonlinear element so that its resonant frequency is set relative to the frequency of one or more optical input signals. Where mentioned specifically herein, 'tuning' may also refer to configuring the nonlinear element so that its resonant frequency is tuned to a frequency (e.g., carrier frequency If an optical input signal. 'Detuning' generally refers to configuring a nonlinear element so that its resonant frequency is set at a frequency that is different from the frequency of an optical input signal.

An 'optical resonator' or 'optical cavity' is defined as a construct which traps light for a finite period of time and then either transmits, reflects, or extinguishes the light. A resonator in a photonic crystal is created by placing one or more pathways where light can exist and surrounding those pathways with periodic structures that confine the light to the pathways. In the case of two-dimensional photonic crystals, the periodic structures are air holes and/or semiconductor rods defined in the medium composing the photonic crystal and the pathways are usually defined by the absence of structures such as holes or rods in the medium. A resonator may also comprise a ring-like waveguide made out of semiconductor material or optical fiber. The ring is coupled to input and output ports. A resonator may alternatively comprise a medium surrounded by reflective surfaces that are either alternating dielectric materials, alternating materials with differing indices of refraction, surfaces that are low index terminated for total internal reflection, or metallic surfaces. A resonator may also comprise superimposed gratings whose reflective orders are aligned so that light can be selectively trapped. A resonator may also comprise a nonlinear material that contains an electromagnetically induced index profile which holds light (e.g., soliton or voltage induced profiles).

'Substrate' is a workpiece or starting material upon which a logic gate is formed. The substrate can be a wafer such as one used in the semiconductor or microlithography industries. For example, the substrate can be composed of one or more substances including semiconductor or semiconductor-on-insulator (SOI) substrates. Possible materials include silicon (Si), silicon dioxide ($SiO_2$), gallium arsenide (GaAs), gallium (Ga), boron (B), phosphorus (P), gallium phosphide (GaP), gallium nitride (GaN), and others.

'Upstream' refers to a position or element that is at a position toward the origination of light in an optical gate or circuit relative to a reference point. It can also refer to a direction toward the origination of light.

'Waveguide' refers to any structure or combination of media that can confine and guide light. For example, a waveguide can be an optical fiber in which a core is surrounded by cladding with a higher index of refraction (RI) than that of the core, which has the effect of confining light within a certain wavelength within the core. A waveguide can also be formed in a photonic crystal in which light propagates more readily in pathways defined in the photonic crystal as opposed to areas in which structures are defined in the photonic crystal.

Nonlinear Element for all-Optical Logic Gate

FIG. 1 shows a graph of transmission as a percentage of the intensity of input light versus frequency of the input light for a nonlinear element implemented in this case as an optical resonator. The input light has a frequency 1 of one-hundred-ninety-two-point-nine (192.9) THz (i.e., a wavelength of 1.55 micrometers). The nonlinear element has a resonant frequency 2 of one-hundred-ninety-three (193) terahertz (THz) and is thus detuned from the frequency 1 of the input light. In FIG. 1 the power of the input light is insufficient to cause the optical cavity to shift into resonance.

Thus, the percentage of carrier frequency light transmitted through the cavity is relatively low, approximately zero, in the situation represented by FIG. 1.

FIG. 2 shows a graph of transmission through the nonlinear element implemented as an optical resonator as a percentage of the intensity of the light input to the nonlinear element. In the situation represented by FIG. 2, the power of the input light is sufficiently high that the nonlinear element shifts into resonance. In other words, the optical power is sufficiently high and close in frequency that the light resonates in the nonlinear element and outputs a relatively large amount of the input light, nearly one-hundred percent. As will become subsequently apparent, this selective resonance feature of a nonlinear element can be used to good advantage in the logic gates subsequently described.

All-Optical Logic Gates Using Nonlinear Elements

FIG. 3 is an all-optical logic inverter (NOT gate) 10 that comprises two separate input media 3 and 4 which can be separate waveguides. The input media 3 and 4 align or merge with a combining medium 5, which can be a single waveguide or photonic crystal, for example. The combining medium 5 is configured to channel the optical input signals A, B on respective input media 3 and 4, to a nonlinear element 6 such as an optical resonator. The optical input signal A in this embodiment is continuous wave (CW) light having constant power which is channeled into the first optical input medium 3, and optical input signal B is amplitude-modulated light data (e.g., a data stream) that is channeled into the second optical input medium 4. The nonlinear element 6 is precisely detuned so that if only the continuous wave light enters the nonlinear element, the nonlinear element shifts into resonance in which the element's resonant frequency 1 aligns with the frequency 2 of the CW light and outputs light as the optical output signal on optical output medium 7.

In FIG. 4, an amplitude-modulated optical input signal A (e.g., CW light) at substantially the same frequency as the second optical input signal B (e.g., a pulse or digital bit) from the second input medium 4 combines with the CW light in the combining medium 5 and enters the nonlinear element 6. The optical power incident on the nonlinear element 6 either increases or decreases sufficiently through constructive or destructive interference, depending upon the phase difference between the CW light of optical input signal A and the amplitude-modulated optical input signal B, to shift the nonlinear element out of resonance which causes the output on waveguide 7 to switch to an 'off' or low amplitude or logic level. Because the device of FIGS. 3 and 4 outputs the inverse of the logic level (i.e., amplitude level) of the received amplitude-modulated optical input data on the second input medium 4, it is effectively an optical logic inverter. Because the light power output of the inverter 10 is solely determined by the power of the CW light on input medium 3 and not by the potentially diminished data of amplitude-modulated optical input signal B on medium 4, the logic inverter of FIGS. 3 and 4 performs all-optical logic level restoration analogously to the way in which electronic inverters or transistors tied to voltage sources can perform logic level restoration.

FIG. 5 is an all-optical AND gate device 20 that comprises two separate optical input media 23 and 24 which can be waveguides aligned with or merging into a combining medium 25 which can be a single waveguide or pathway defined in a photonic crystal, for example. The combining medium 25 is configured so that it aligns with or is optically coupled to nonlinear element 26. Amplitude-modulated optical input signals A, B each modulated with respective data are channeled into respective optical input media 23 and 24 and combine in combining medium 25 before entering the nonlinear element 26. As shown in FIG. 5, if either or both of the optical input signals A, B has a low or 'off' logic level, then the nonlinear element 26 generates the optical output signal to have a low or 'off; logic level. The nonlinear element 26 is sufficiently detuned away from the carrier frequency 1 of the optical input signals A, B so that the nonlinear element 26 output on optical output medium 27 switches 'on' only when both inputs are 'on' at the same time, as shown in FIG. 6. This behavior corresponds to an all-optical AND gate. The light power output on medium 27 transmits twice the power of either of its inputs, i.e., the optical output signal has a logic level that is the addition of the logic levels of the optical input signals A, B. This enhanced output power could be detrimental if any subsequent devices are specifically designed to receive the typical intensity of a logical '1' bit (i.e, high amplitude or logic level). Two solutions exist for this problem in this embodiment: either the subsequent logic gates are designed for twice as much power from an AND gate by further detuning any subsequent receiving nonlinear elements, or a single level follower (the AND gate of FIGS. 5 and 6 receiving CW light at one of optical input signals A, B and amplitude-modulated data in the other of the optical input signals A, B, with the resonant frequency detuned sufficiently to output only half as much power when both inputs are high and only if the two signals destructively interfere, but no power if either is at a low logic level) or two inverters can be placed in series after the AND gate in order to restore the proper output power level.

In one embodiment of the invention, an all-optical NAND gate 30 as shown in FIG. 7 results by placing an inverter such as the gate 10 of FIGS. 3 and 4 following the AND gate 20 of FIGS. 5 and 6. More specifically, if the output medium 27 of the gate 20 of FIGS. 5 and 6 is aligned with or optically coupled to the input medium 4 of the gate 10 of FIGS. 3 and 4, then an all-optical NAND gate 30 is produced in which the data of optical output signal follows NAND Boolean logic with respect to the optical input signals A, B on input media 23, 24. Thus, if the optical input signals A, B both have low logic levels, then the resulting optical output signal generated by the NAND gate 30 has a 'high' logic level, and if either or both of the optical input signals A, B has a 'low' logic level, the resulting optical output signal generated by the NAND gate 30 has a 'high' logic level. More specifically, the nonlinear element 6 is tuned with respect to the carrier frequency 2 of the optical input signals A, B so that only if both optical input signals A, B are at a high logic level does the amplitude of the optical signal on media 27, 4 have sufficient amplitude upon combination with optical input signal C (CW light) to shift the resonance frequency 1 of the nonlinear element 6 away from the carrier frequency 2 of the optical input signals A, B, C so that the optical output signal on the medium 7 has a low logic level. Otherwise, if either or both of the optical input signals A, B has a low logic level, then the optical signal on media 27, 4 has insufficient power upon combination with optical input signal C to shift the nonlinear element 6 out of resonance, so that the optical output signal on medium 7 has a 'high' logic level in this situation.

FIG. 8 is an all-optical NOR gate 50 that comprises an optical inverter 10 combined with an OR gate 40. The OR gate 40 comprises two separate input media 41 and 42 (e.g., optical waveguides or pathways through a photonic crystal)

aligning with or merging into combining medium 43 (e.g., a single optical waveguide or a region of a photonic crystal). If the amplitude of either or both of the optical input data signals A, B on media 41, 42 is high (i.e., has a high amplitude or logic level), then the data on optical output signal on medium 43 is high (i.e., high amplitude or logic level). Conversely, if both the optical input data signals on media 41, 42 are in a low logic level (i.e., low amplitude or logic level), then the optical output data signal on medium 43 is likewise in a low logic level (i.e., low amplitude or logic level). The combining medium 43 is aligned with or optically connects to the input medium 4 of inverter 10 which can be structured and function similarly to the device previously described with reference to FIGS. 3 and 4. If either or both of the optical input signals A, B on input media 4 to this device contain sufficient power (i.e., are in the 'high' or 'one' logic level with corresponding high amplitude level), the optical output signal on the inverter's output medium 7 switches off (i.e., has a low amplitude or logic level). Otherwise, the optical output signal generated by the inverter 10 remains 'on' (i.e., has a high amplitude or logic level). Because this gate 50 terminates with an inverter 10, it also restores diminished logic levels by receiving an optical input signal C having constant continuous wave (CW) light on medium 3 input to the inverter 10, which has power sufficient to restore logic levels.

In one embodiment of the invention shown in FIG. 9, an all-optical OR gate 55 comprises the OR gate 40 of FIG. 8 optically aligned or coupled to first and second inverters 10, 10' as shown in FIGS. 3 and 4. Although the gate 40 of FIG. 8 achieves the same logical function as this optical logic gate, the embodiment of FIG. 9 allows for logic level restoration, while a simple passive waveguide does not.

FIG. 10 is an all-optical XOR gate 60 that comprises two separate input media 53 and 54 merging into a single combining medium 55. The combining medium 55 optically aligns or connects with a nonlinear resonator 56. The nonlinear resonator 56 is detuned in its resonance frequency 51 from the optical input data signals' carrier frequency 52 by half as much as in the case of the optical AND gate 20 of FIGS. 5 and 6 so that the optical output signal on medium 57 switches on (i.e., has a high amplitude or logic level) only when a single optical input signal 53, 54 is on (i.e., has a high amplitude or logic level). If both optical input signals A, B are on (i.e, have a high amplitude or logic level), the nonlinear element's resonance frequency 51 shifts too far with respect to the input carrier frequency 52 to permit transmission of light to the optical output medium 57, and the nonlinear element 56 turns off the light on medium 57 so that the optical output signal has a low logic level. If neither optical input signal A, B is on, the nonlinear element 56 outputs no significant light so that the optical output signal has a low logic level. Because this gate 60 outputs light as an optical output signal with a high logic level if a single optical input signal A, B is on, no logic level restoration is needed to compensate for its operation.

In one embodiment of the invention, an all-optical XNOR gate 65 shown in FIG. 11 comprises an XOR gate 50 (FIG. 10) followed by an inverter 10 (FIGS. 3 and 4). In this embodiment, if both of the optical inputs signals A, B have a high logic level, then the optical output signal generated by the XOR gate 50 has a low logic level. The XOR gate 50 outputs the optical output signal with a low logic level on medium 57, which is input to the inverter gate 10 on medium 4 as one optical input signal. The other optical input signal C is CW light input to the inverter gate 10 on optical input medium 3. These signals combine in medium 5 and the resulting combined signal has insufficient power to shift the resonance frequency 1 of the nonlinear element 6 out of resonance relative to the carrier frequency of the optical input signals. Accordingly, the optical output level generated by the inverter gate 10 has a 'high' logic level. If both of the optical input signals A, B are at a low logic level, then the optical output signal generated by nonlinear element 6 has a 'low' logic level. The optical output signal from XOR gate 50 on optical output medium 57 is input to the inverter gate 10 on optical input medium 4, and its level is insufficient upon combination with the optical input signal C to generate a combined signal with amplitude sufficient to drive the nonlinear element 6 out of resonance. Accordingly, the optical output signal generated by the inverter gate 10 has a high logic level. If either, but not both, of the optical input signals A, B has a low logic level, then the nonlinear element 56 is driven into resonance so that the optical output signal from the XOR gate 50 has a 'high' logic level. This 'high' logic level is output on medium 57, and received as one of the optical input signals to the inverter gate 10 via medium 4. This optical input signal combines in medium 5 with the optical input signal C (CW light) and the amplitude of the resulting combined signal is sufficient to drive the resonant frequency 1 of the nonlinear element 6 away from the carrier frequency 2 of the combined signal (which is the same as the optical input signals), causing the optical output signal generated by the XNOR logic gate 65 to switch to a 'low' logic level. The gate 65 thus performs XNOR logic operation on the optical input signals to generate its optical output signal.

FIG. 12 is an all-optical memory latch 70 comprising two optical input signals R and S which are optically coupled to separate NAND gates 30, 30' (FIG. 7). The optical output signals Q, Q-bar of both NANDs 10 and 10 are then connected to respective second input media 24, 24' as the second inputs of the opposite NAND 30, 30'. The media 24, 24' cross at intersection 73 in this embodiment which results in no cross-talk due to an optical cross-talk filter 74. This device operates just as a basic electronic NAND latch does, where the following logic table is implemented:

| S | R | Q | Q-bar |
|---|---|---|---|
| 0 | 0 | invalid | invalid |
| 0 | 1 | 1 | 0 |
| 1 | 0 | 0 | 1 |
| 1 | 1 | Q | Q-bar |

Thus, logic controlled all-optical memory is possible, because the optical output signal on output medium 7 can be set to the desired value and then stored based on the optical input signals S and R. Because this device's optical output signal is effectively generated by inverters 10, 10' using a constant continuous wave (CW) light, its logic level is continuously restored on every switching cycle. Therefore, the stored signal can be recycled indefinitely, which allows for all-optical memory performance that already exists in electronic memory gates. The all-optical latch disclosed in this embodiment is not the only manner of creating memory from logic gates and should not be considered an exclusive example of how this invention can function as all-optical memory.

To specifically describe the operation of the latch 70, if the optical input signals S, R both have low logic levels, then the nonlinear elements 26, 26' do not receive optical input signals with sufficient power to drive the nonlinear elements 6, 6' out of resonance so the optical output signals Q, Q-bar both have high logic levels due to input of respective optical input signals of CW light on media 3, 3'. Both optical output signals Q, Q-bar having the same logic level is considered an invalid logic level of the latch 70. If the optical input signals S, R have low and high logic levels, respectively, then the high logic level of the optical input signal R forces the optical output signal Q-bar of the NAND gate 30' to a low logic level which is fed back to the NAND gate 30, forcing the nonlinear element 6 to resonate with the CW light input thereto, resulting in the nonlinear element 6 generating a high logic level for the optical output signal Q. If the optical input signals S, R have high and low logic levels, respectively, then the high level of the optical input signal S forces the optical output signal Q generated by NAND gate 30 to a low logic level. The fact that the optical output signal Q is fed back as an optical input signal to the NAND latch 30' ensures that the optical output signal Q has a high logic level. Finally, if both the optical input signals R, S have high logic levels, then neither of the NAND gates 30, 30' switches logic level and the logic level of the optical output signals Q, Q-bar does not change.

Exemplary Method of Manufacturing an all-Optical Logic Gate

Having described the structure and function of the all-optical logic gates and circuits in accordance with the invention, an exemplary method of manufacturing an all-optical logic gate will now be described.

In FIG. 13 a silicon-on-insulator wafer substrate 80 is treated with nitrogen gas to remove dust and debris. The substrate 80 is polished using a grinding machine and powder. Using a molecular beam epitaxy (MBE) tool, a two-hundred to four-hundred nanometer (200-400 nm) thick layer of silicon 81 with a surface roughness less than five nanometers (5 nm) is grown on the silicon substrate 80. The wafer 80 is then placed in an electron-beam lithography chamber. In order to prevent proximity effects, each minimum feature area is sequentially exposed to electron etching. Each such "pixel" is selectively exposed manually without the use of external software. The device's features are etched to define holes 82 (only a few of which are specifically labeled in FIG. 13) that penetrate vertically into the substrate with two-hundred-thirty-one nanometers (231 nm) diameters and are spaced four-hundred-twenty nanometers (420 nm) apart in the same row, and the adjacent rows' holes are defined in layer 81 so that they are shifted left or right by two-hundred-forty nanometers (240 nm), relative to the first row e.g., to form a triangular photonic crystal lattice. Holes are not etched only where light is intended to propagate within the device 10 to be formed in layer 81. The photonic crystal structure is advantageous for use in forming a logic gate for several reasons. First, sub-micron pathways can be defined in photonic crystals to quickly change the direction of light propagation to guide the optical signals through the pathways defining the logic circuit. Also, photonic crystal cavities can have very high Q-factors in sub-micron to micron scales, resulting in lower power requirements to perform logic switching.

The nonlinear element 6 is formed by inserting holes on either side of where the light is to be trapped. The nonlinear element may be tuned or detuned from the input carrier frequency either by varying the diameter of the holes, increasing or decreasing the distance between the holes on each side, by increasing or decreasing the number of holes on one or both sides, or a combination of these techniques. Typically, the number of holes and the distance between both sides will remain fixed due to desired switching powers, lifetimes, and bandwidths. Therefore, in this specific procedure, the diameters of the interior- and exterior-most holes are solely modified in order to tune the resonator to transmit at a desired wavelength(s).

At the left and right edges where external light enters or exits the device, the substrate is etched deeply in order to gain side access to the insulator below the device. After the entire area is exposed to form optical logic gate(s), the wafer is immersed in hydrofluoric (HF) acid until the insulator directly below the device is washed away, resulting in an air-suspended membrane bridge 83 as shown in FIGS. 13 and 15. After cleaning the wafer 80, the edges are cleaved to create an optical chip 84.

Fiber waveguides 3a, 4a are cleaved and polished, and index-matching adhesive 3b, 4b is applied to the end of the fibers to attach same to protrusions 3c, 4c. The fiber may be secured to a bridge 85 within the chip 84 by adhesive or other mechanical attachment 86 so that it is held in place relative to the waveguide end of the optical logic gate device 10. Opposite ends of the fiber can be attached at the input side to a CW laser source or upstream signal source as appropriate to provide the logic gate 10 with optical input signals A, B. The optical input signals A, B are then provided to the device 10 via respective fibers 3a, 4a, adhesive 3b, 4b, and protrusions 3c, 4c. The optical input signals A, B further travel through respective regions 3d, 4d to combining medium 5. Light resulting from the combination of the optical input signals travels to the resonator 6 where it is trapped. The resonator 6 outputs the optical output signal to a region 7d where it propagates to protrusion 7c into adhesive 7b and ultimately to optical fiber 7a where it travels to the output end of the fiber 7a which may terminate as the input to a subsequent logic gate or as the ultimate output of the chip 84. The output end of fiber 7a can be spliced to another optical fiber or optical circuit (not shown) in a similar manner as described above, or using a large number of techniques and devices known to those of ordinary skill in the art.

As shown in FIG. 14, the optical input and output media 3, 4, 7 can be coupled to respective fibers using a butt-coupling technique. In this case, the logic gate 10 is defined so that the defines holes gradually taper 3e, 4e to be more narrow along the direction of propagation of the optical input signals on the input side of the logic gate 10 to match the modal profile of the optical output signal. At the output medium 7, the configuration is reversed and the taper 7e defined by holes in the substrate 81 gradually increases or becomes wider along the direction of propagation of the optical output signal from the device 10 so that the modal profile of the output of the gate 10 matches with that within the output medium 7a. Waveguides coupling light in and out of an external source are slowly tapered to match the modal profile of a butt-coupled fiber.

FIGS. 15 and 16 show the optical resonator 6 of the logic gate 10 in further detail. It is evident that the outermost holes at each end of the resonator 6 are smaller than the innermost hole. If other holes were to be included in the resonator 6, then they would be positioned between the outermost and innermost holes and would have the same size as the holes used elsewhere in the photonic crystal outside of the resonator 6.

Another embodiment of the invention is the logic gate device 90 of FIG. 17. This logic gate 90 uses a semiconductor "wire" instead of photonic crystals formed on an semiconductor-on-insulator (SOI) substrate 90. Photonic wires 93c, 94c are etched using the same equipment as above, which then directly or evanescently connect to a ring or loop wire waveguide that act as nonlinear element 96 which in this case is a circulator or resonator. The nonlinear element 96 is tuned or detuned by defining the circumference of the ring of the nonlinear element 96. All other procedures are followed as in the previous example except that no membrane bridge is built, and the device 90 remains on the insulator substrate 90. In operation, optical input signals A, B travel on respective input media 93, 94 to the combining medium 95. More specifically, the optical waveguides 93a, 94a are aligned with and optically coupled to the wires 93c, 94c using adhesive 93b, 94b. Optical input signals on respective waveguides 93a, 94a thus travel through adhesive 93b, 94b into optical wires 93c, 94c which merge into medium 95 where the optical input signals combine. The combining medium 95 evanescently couples the optical input signals to the nonlinear element 96. Depending upon the logic levels of the optical input signals on media 93, 94, the nonlinear element 96 outputs the optical output signal by evanescent coupling to the optical wire 97c, through adhesive 97b, and into the output optical waveguide 97a, which form the output medium 97.

The embodiment of the logic gate 100 of FIG. 18 is similar in most respects to that of FIG. 17 with the exception that the combining medium 95 is dispensed with in FIG. 18 by optically coupling the optical input signals through respective media 93, 94 directly to the nonlinear element 96 where such signals both combine and interfere with one another to generate the optical output signal on output medium 97.

Another embodiment of a logic gate 110 of the invention shown in FIG. 19 comprises optical fibers 103a, 104a, 106a, 107a. Typical single-mode optical fibers 103a, 104a are used as waveguides, which then connect to a fiber 106a comprising nonlinear material. Nonlinear fibers are usually made of weak Kerr materials such as silica. Bragg gratings 106b, 106c are then created in the nonlinear fiber at spaced positions by exposing periodic sections of the fiber 106a to intense light (e.g., from a CO2 laser). The resulting nonlinear element 106 can be tuned by either altering the length and placement of the intense light exposure or by bending the fiber to change the resonator geometry.

FIG. 20 shows an embodiment of an optical logic gate 110 which has nonlinear element 116 comprised of nonlinear material 116a and mirrors 116b, 116c. The optical logic gate 110 also comprises media 113, 114, in this case illustrated as optical fibers, for transmitting optical input signals to the nonlinear material 116, and output medium 117 for outputting the optical output signal generated by the nonlinear material 116. More specifically, optical input signals from the media 113, 114 travel to and pass through one-way mirror 116b where they combine in medium 115 to produce a combined signal which enters the nonlinear material 116a. The medium 115 can be air or ambient environment outside of or within the nonlinear element 116, or it can be the nonlinear material 116a either alone or in combination with the ambient environment. Depending upon the resonant frequency of the nonlinear element 116 in relation to the frequency of the optical input signals, the combined signal is either extinguished or transmitted by the nonlinear material 116a. The nonlinear material 116a can be composed of ester-based dyes, for example. Any combined signal passing through the nonlinear material 116a propagates to and through the one-way mirror 116c and onward to the optical medium 117 from which it is output from the optical logic gate 110. The cavities may be tuned by either changing the distance between the mirrors or by changing the resonator's geometry.

FIG. 21 is a block diagram of a generalized all-optical logic gate 200 in accordance with the invention. In FIG. 21 the all-optical logic gate 200 comprises a nonlinear element 206 comprising one or more of an optical resonator or optical cavity formed by photonic crystal, Bragg gratings in an optical fiber of nonlinear material, a circulator, a distributed feedback (DFB) laser, or other nonlinear device. The optical input signals A, . . . , B (the ellipsis ' . . . ' represents the fact that there may be more than two signals), at least one of which is amplitude-modulated are provided directly to the nonlinear element 206 which is configured to combine the optical input signals A, . . . , B and discriminate the logic level(s) of the resulting combined signal, and generate a binary logic level at its output in accordance with the logic operation the nonlinear element 206 is configured to perform, e.g., by setting its resonant frequency in relation to the carrier frequency of the optical input signals A, . . . , B. Alternatively, as shown in phantom line in FIG. 21, the optical input signals A, . . . , B are provided to combining medium 205 such as a waveguide or a pathway where optical input signals A, . . . , B combine. The resulting combined signal passes to the nonlinear element 206 which discriminates the logic level in accordance with the logic operation it has been configured to perform, and outputs the amplitude-modulated optical output signal with a logic level based on the logic levels of the optical input signals A, . . . , B. Optical input media 203 can be used to provide optical input signals A, . . . , B from a source or upstream logic gate to the nonlinear element 206, or to the combining medium 205 and from there to the nonlinear element 206. Optical output medium 207 can be used to output the optical output signal to the next logic gate in an optical circuit or to another downstream element.

In FIG. 22 a method of manufacturing an optical logic circuit including one or more optical logic gates begins in Step 220 in which a logic operation to be performed is selected. In Step 222 the optical circuit is designed with one or more logic gates and optical connections as required to perform the selected logic operation. In Step 224 the designed optical circuit is manufactured by forming the logic gate(s) of the circuit so that its resonant frequency(ies) are tuned to perform that part of the logic operation the logic gate is intended to perform according to the design of the optical circuit.

As an example of the method of FIG. 22, assume the optical output signal is to be generated according to the following logic operation selected in Step 220:

Optical output signal=(optical input signal $A$*optical input signal $B$)+optical input signal $C$ In Step 222 the optical circuit is designed. One design capable of achieving the selected logic operation uses an AND logic gate to discriminate optical input signals A, B, and the resulting output signal is input to an OR gate along with the optical input signal C to produce the optical output signal for the selected logic operation. In Step 224 the AND and OR logic gates are then manufactured so that the resonant frequency(ies) of the nonlinear element(s) are tuned or detuned appropriately from the frequencies of the optical input signals in order to generate the desired AND and OR logic gates. The resulting optical circuit is then coupled so that its inputs receive respective optical input signals A, B, C from upstream elements, and the output is coupled to provide the optical output signal to a downstream element.

In FIG. 23 a method of operation of a logic gate begins in Step 230 in which optical input signal(s) are received from an upstream element such as a laser source for CW light, an optical amplitude modulator, or an upstream optical circuit element such as a logic gate. In Step 232 optical input signals are guided. Steps 230 and 232 can be performed by optical input media for respective optical input signals. In Step 234 the optical input signals are combined to generate a combined signal. This step can be performed by the combining medium. Steps 232 and 234 are optional steps, as represented by phantom line in FIG. 23. In step 236 the logic level resulting from the combination of the optical input signal(s) is discriminated to generate an optical output signal with a binary logic level having a low logic level represented by a low amplitude or a high level represented by a high amplitude. Step 236 can be performed by a nonlinear element of a logic gate. Finally, in Step 238 the optical output signal(s) is transmitted to a downstream element such as the next gate(s) in the optical circuit or another optical device.

Correspondence for Means

In the appended claims 'nonlinear element means for nonlinearly discriminating logic levels of optical input signals to generate an optical output signal having binary logic levels' refers to any of nonlinear elements 6, 6', 26, 26', 56, 96, 106, 116, 206 as described herein or equivalents thereof.

Alternatives

While "tuning" an optical resonator typically refers to offsetting the resonator's resonant frequency, this invention also considers "tuning" to also refer to other methods of changing the resonator's transmission characteristics as possible means of achieving desired functionality. For example, the bandwidth, profile, or center of a resonator's transmission might be altered by changing the quality factor or by adding additional resonance peaks into a resonator, or by changing its geometry or index or refraction through the application of stress, electromagnetic or piezoelectric fields, injection of charge carriers such as holes or electrons, injection of light or other techniques.

Although described with reference to optical signals at 1.55 microns (um) which is currently standard in the optical communications industry, it should of course be understood that the principles of the invention can be applied to obtain advantageous results using other wavelengths or frequencies for the optical signals. The optical signals used with the disclosed gates and latches need not necessarily have the same frequency.

Although the embodiments disclosed herein are described in the context of 'positive logic' in which an optical signal with a relatively high amplitude is considered a high logic level and an optical signal with a relatively low amplitude is considered to be at a low logic level, 'negative logic' could instead be employed in which an optical signal with relatively high amplitude is considered a low logic level and an optical signal with relatively low amplitude is considered to be at a high logic level.

Although the structures described herein are two-dimensional structures, it is possible to implement the all-optical logic gates herein with similar functions as previously described using one- or three dimensional structures, as will be readily apparent to those of ordinary skill in the art with the benefit of the teachings provided herein.

Although the structures defining a photonic crystal herein have been described as circular holes in a medium, it should be understood that the reverse could be done instead of making holes in a medium, such as by making posts, columns, cylinders, cubes, spheres, or other structures on a substrate to define a photonic crystal. Furthermore, it is possible to form a photonic crystal through selective deposition of material on a substrate as opposed to selective etching, or a combination of these techniques could be used to form the photonic crystal.

Other possible configurations and functionality are disclosed in commonly-assigned US 2005/0259999 filed May 21, 2004, naming John Luther Covey as sole inventor, which is incorporated herein by reference as if set forth in full in this document.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An all-optical logic gate receiving amplitude-modulated first and second optical input signals, comprising:
first and second optical input media receiving respective first and second optical input signals;
a first combining medium optically coupled to the first and second optical input media to receive respective first and second optical input signals, the first combining medium generating a combined signal based on the first and second optical input signals;
a first nonlinear element optically coupled to receive the combined signal from the first combining medium and having an optical resonator with a resonant frequency tuned relative to the frequency of at least one of the first and second optical input signals so that the first nonlinear element generates a first optical output signal having a high logic level if both of the optical input signals have low logic levels, and generates the first optical output signal having a low logic level if either or both of the first and second signals has a high logic level, the first optical output signal thus having a binary logic level that is amplitude-modulated; and
at least one optical output medium optically coupled to receive and output the first optical output signal generated by the first nonlinear element,
wherein the first and second optical input media, the combining medium, the first nonlinear element and the optical output medium are formed in a photonic crystal, and
wherein the first nonlinear element is optically positioned between an output of the combining medium and an input to the optical output medium.

2. An all-optical logic gate as claimed in claim 1 wherein the output side of the first combining medium and the input side of the optical output medium are optically aligned with one another.

3. An all-optical logic gate as claimed in claim 1 wherein the first nonlinear element is defined by first and second sets of spaced structures bounding a region with an absence of structures to define a cavity.

4. An all-optical logic gate as claimed in claim 3 wherein the first and second sets of spaced structures each include a plurality of structures of varying size.

5. An all-optical logic gate as claimed in claim 1 wherein the first and second optical input media, the first combining medium and the optical output medium are defined in the photonic crystal by the absence of structures.

6. An all-optical logic gate as claimed in claim 1 wherein the optical resonator is composed of an intensity-dependent refractive index material.

7. An all-optical logic gate as claimed in claim 1 wherein the photonic crystal is implemented in a silicon-on-insulator (SOI) substrate.

8. An all-optical logic gate as claimed in claim 1 wherein the photonic crystal is implemented in a silicon (Si) substrate.

9. An all-optical logic gate as claimed in claim 1 wherein the photonic crystal is implemented in a gallium arsenide (GaAs) substrate.

10. An all-optical logic gate as claimed in claim 1 further comprising:
    third and fourth optical input media, the third optical input medium optically coupled to the optical output medium to receive the first optical output signal as a third optical input signal, and the fourth optical input medium optically coupled to receive a fourth optical input signal having constant continuous wave (CW) light;
    a second combining medium optically coupled to the third and fourth optical input media to receive respective third and fourth optical input signals, the second combining medium generating a combined signal based on the third and fourth optical input signals;
    a second nonlinear element having an optical resonator with a resonant frequency tuned relative to the frequency of at least one of the third and fourth optical input signals so that the second nonlinear element outputs the CW light as a second optical output signal with a high logic level if the third optical input signal has a low logic level, and the second nonlinear element outputs substantially no light as the optical output signal with a low logic level if the third output signal has a high logic level, the second optical output signal thus having a binary logic level that is amplitude-modulated with the amplitude of the high logic level determined substantially by the amplitude of the CW light,
    wherein the third and fourth optical input media and the second nonlinear element are formed in the photonic crystal, and
    wherein the second nonlinear element is optically positioned between an output of the second combining medium and an input to a second optical output medium.

11. A method of using an all-optical logic gate to receive amplitude-modulated first and second optical input signals, the method comprising:
    receiving in first and second optical input media respective first and second optical input signals;
    generating, by using a first combining medium, a combined signal based on the first and second optical input signals, the first combining medium optically coupled to the first and second optical input media to receive respective first and second optical input signals;
    generating, by using a first nonlinear element, a first optical output signal having a binary logic level that is amplitude-modulated, the first nonlinear element optically coupled to receive the combined signal from the first combining medium and having an optical resonator with a resonant frequency tuned relative to the frequency of at least one of the first and second optical input signals so that the first nonlinear element generates the first optical output signal having a high logic level if both of the optical input signals have low logic levels, and generates the first optical output signal having a low logic level if either or both of the first and second signals has a high logic level; and
    receiving and outputting the first optical output signal generated by the first nonlinear element by using at least one optical output medium,
    wherein the first and second optical input media, the combining medium, the first nonlinear element and the optical output medium are formed in a photonic crystal, and
    wherein the first nonlinear element is optically positioned between an output of the combining medium and an input to the optical output medium.

12. The method as claimed in claim 11 wherein the output side of the first combining medium and the input side of the optical output medium are optically aligned with one another.

13. The method as claimed in claim 11 wherein the first nonlinear element is defined by first and second sets of spaced structures bounding a region with an absence of structures to define a cavity.

14. The method as claimed in claim 13 wherein the first and second sets of spaced structures each include a plurality of structures of varying size.

15. The method as claimed in claim 11 wherein the first and second optical input media, the first combining medium and the optical output medium are defined in the photonic crystal by the absence of structures.

16. The method as claimed in claim 11 wherein the optical resonator is composed of an intensity-dependent refractive index material.

17. The method as claimed in claim 11 wherein the photonic crystal is implemented in a silicon-on-insulator (SOI) substrate.

18. The method as claimed in claim 11 wherein the photonic crystal is implemented in a silicon (Si) substrate.

19. The method as claimed in claim 11 wherein the photonic crystal is implemented in a gallium arsenide (GaAs) substrate.

20. The method as claimed in claim 11 further comprising:
    receiving, in a third optical input medium, the first optical output signal as a third optical input signal, the third optical input medium optically coupled to the optical output medium;
    receiving, in a fourth optical input medium a fourth optical input signal having constant continuous wave (CW) light;
    receiving, in a second combining medium optically coupled to the third and fourth optical input media, respective third and fourth optical input signals, and generating a combined signal based on the third and fourth optical input signals;
    using a second nonlinear element having an optical resonator with a resonant frequency tuned relative to the frequency of at least one of the third and fourth optical input signals to output the CW light as a second optical output signal with a high logic level if the third optical input signal has a low logic level, and to output substantially no light as the optical output signal with a low logic level if the third optical output signal has a high logic level, the second optical output signal thus having a binary logic level that is amplitude-modulated with the amplitude of the high logic level determined substantially by the amplitude of the CW light, wherein the third and fourth optical input media and the second nonlinear element are formed in the photonic crystal, and wherein the second nonlinear element is optically positioned between an output of the second combining medium and an input to a second optical output medium.

* * * * *